United States Patent
Bovington

(10) Patent No.: US 6,699,387 B2
(45) Date of Patent: Mar. 2, 2004

(54) WASTE WATER FILTER HAVING MULTIPLE WALL FILTER ELEMENTS AND OUTLET PROTECTION

(76) Inventor: Thomas P. Bovington, 3506 Rimini Rd., Helena, MT (US) 59624

( * ) Notice: Subject to any disclaimer, the term of this patent is extended or adjusted under 35 U.S.C. 154(b) by 0 days.

(21) Appl. No.: 10/151,863

(22) Filed: May 22, 2002

(65) Prior Publication Data

US 2002/0134720 A1 Sep. 26, 2002

Related U.S. Application Data

(62) Division of application No. 09/250,004, filed on Feb. 12, 1999, now Pat. No. 6,416,664.

(51) Int. Cl.⁷ .............................................. B01D 35/02
(52) U.S. Cl. ....................... 210/256; 210/452; 210/299; 210/416.1; 210/532.2
(58) Field of Search ................................ 210/238, 256, 210/299, 323.2, 338, 339, 335, 342, 337, 418, 416.1, 451, 452, 532.2

(56) References Cited

U.S. PATENT DOCUMENTS

| | | | | |
|---|---|---|---|---|
| 2,023,423 A | * | 12/1935 | Kleckner | |
| 3,341,023 A | * | 9/1967 | Seter | |
| 4,243,535 A | * | 1/1981 | Behrends et al. | |
| 4,439,323 A | | 3/1984 | Ball | 210/608 |
| 4,525,275 A | * | 6/1985 | Ostlund | |

(List continued on next page.)

OTHER PUBLICATIONS

Orenco Systems Inc.—Biotube Pump Vault Brochure.

*Primary Examiner*—Christopher Upton

(57) ABSTRACT

A waste water filter comprises a shield comprising a vertical peripheral wall defining a shield interior. The shield further includes an inlet for the entry of unfiltered wastewater into the shield interior. A shield filter element is disposed within the shield interior. An outlet in fluid communication with the second interior location for discharging filtered waste water is also included into the waste water filter. The shield filter element includes at least one filter surface having filter surface openings for the passage of relatively clear water while restricting the passage of solids larger than the openings. The shield filter element, when disposed within the shield, separates the shield interior into first and second interior locations. Unfiltered or partially filtered waste water in the first interior location is separated from filtered waste water in the second location by the shield filter element. The shield filter element is removable from the shield. Unfiltered or partially filtered waste water entering the shield interior after shield filter element removal will enter the first and second interior locations within the shield. The waste water filter further includes an outlet filter, a gate valve, or proper outlet reservoir inlet opening positioning for preventing the flow of unfiltered or partially filtered waste water from the shield interior from passing through the outlet after the removal of the filter element from the shield. The outlet filter is typically disposed within the waste water filter independent of the shield filter element. The waste water filter may include filter elements comprising two or more filter surfaces which may be disposed in a concentric arrangement.

8 Claims, 32 Drawing Sheets

U.S. PATENT DOCUMENTS

| | | | |
|---|---|---|---|
| 4,710,295 A | 12/1987 | Zabel | 210/336 |
| 5,207,896 A | 5/1993 | Graves | 210/109 |
| 5,382,357 A | 1/1995 | Nurse | 210/170 |
| 5,480,561 A | 1/1996 | Ball et al. | 210/744 |
| 5,482,621 A | 1/1996 | Nurse | 210/170 |
| 5,492,635 A | 2/1996 | Ball | 210/802 |
| 5,531,894 A | 7/1996 | Ball et al. | 210/605 |
| 5,580,453 A | 12/1996 | Nurse, Jr. | 210/323.2 |
| 5,582,716 A | 12/1996 | Nurse, Jr. | 210/121 |
| 5,591,331 A | 1/1997 | Nurse, Jr. | 210/232 |
| 5,593,584 A | 1/1997 | Nurse, Jr. | 210/346 |
| 5,635,064 A | 6/1997 | Bovington | 210/338 |
| 5,683,577 A | 11/1997 | Nurse, Jr. | 210/170 |
| 5,690,824 A | 11/1997 | Stuth | 210/333.01 |
| 5,736,035 A | 4/1998 | Nurse, Jr. | 210/172 |
| 5,759,393 A | 6/1998 | Nurse, Jr. | 210/232 |
| 5,762,790 A | 6/1998 | Zoeller | 210/238 |
| 5,762,793 A | 6/1998 | Nurse, Jr. | 210/323.2 |
| 5,779,896 A | 7/1998 | Nurse, Jr. | 210/299 |
| 5,795,472 A | 8/1998 | Nurse, Jr. | 210/232 |
| 5,904,847 A * | 5/1999 | Bovington | 210/532.2 |
| 5,985,139 A * | 11/1999 | Zoeller | 210/532.2 |
| 6,136,190 A * | 10/2000 | Zoeller et al. | 210/299 |
| 6,231,764 B1 * | 5/2001 | Wilkins | 210/532.2 |

* cited by examiner

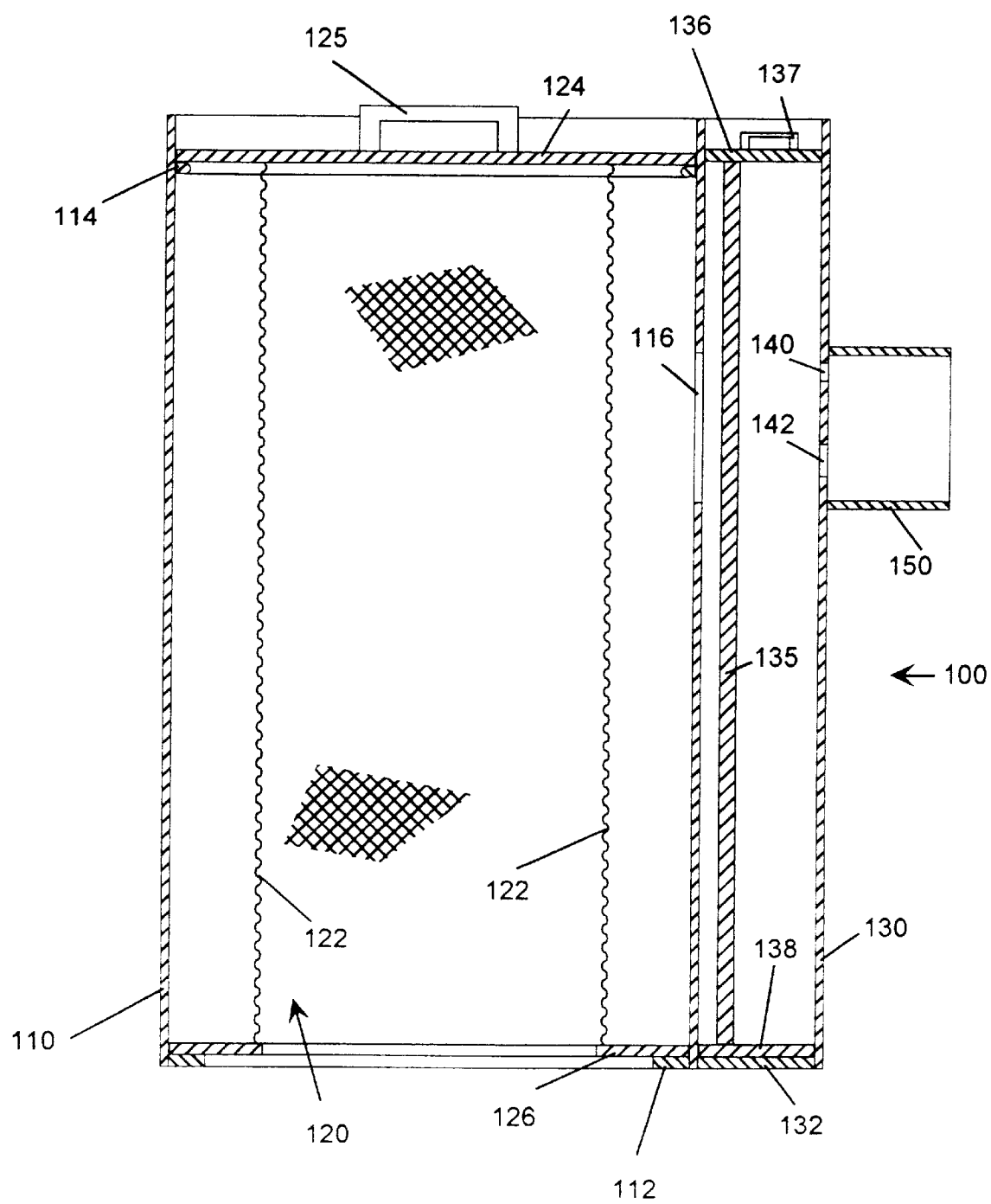

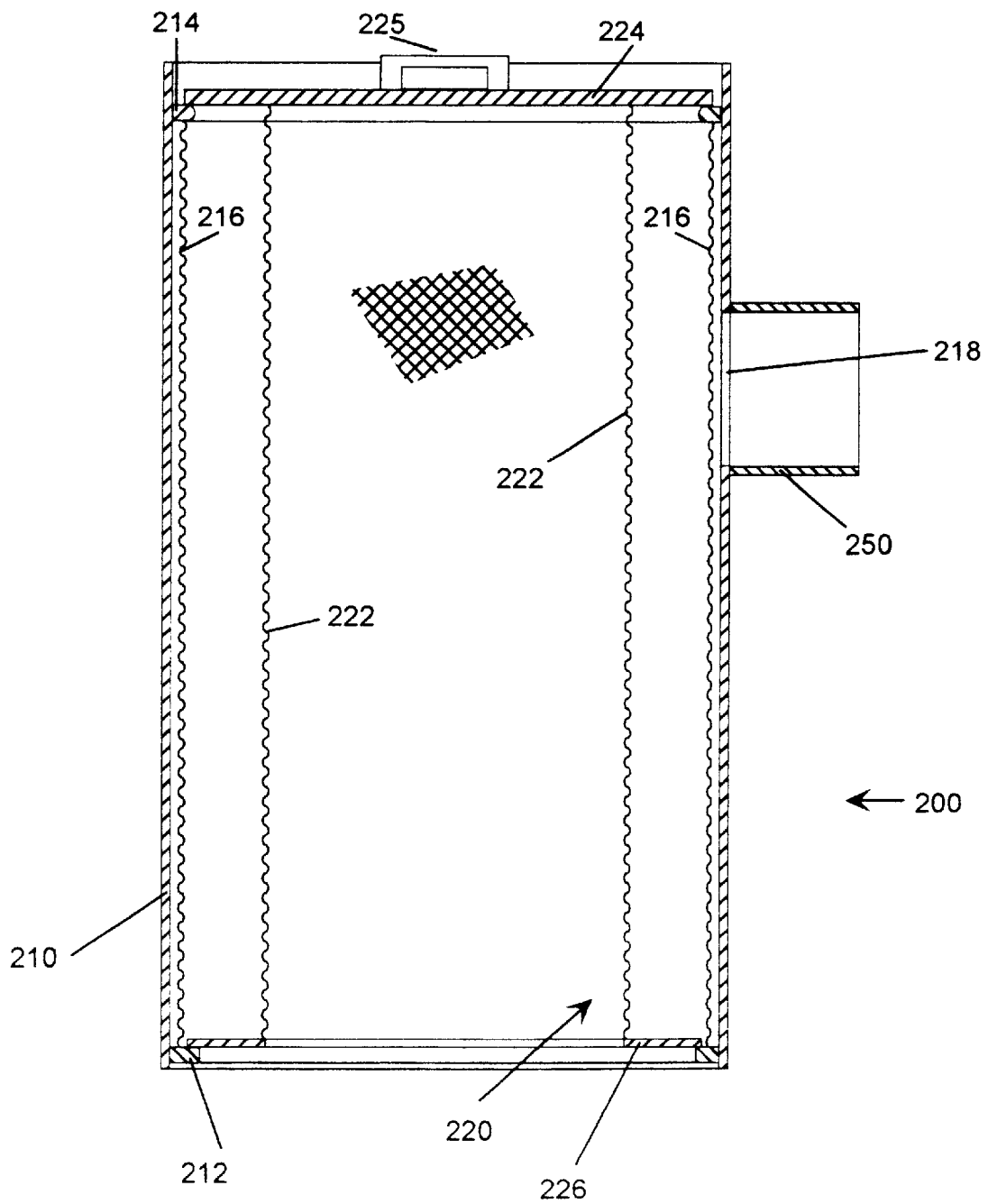

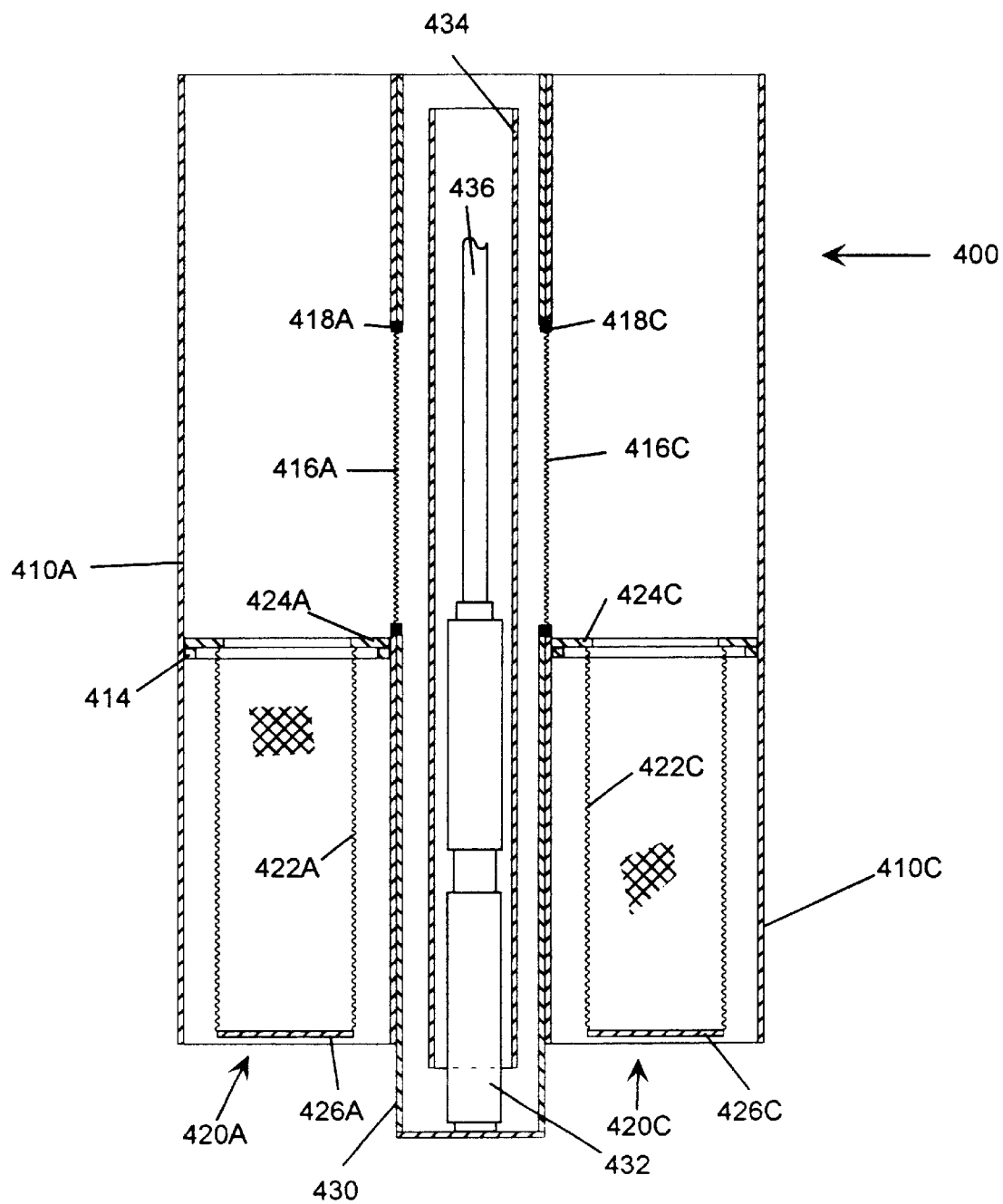

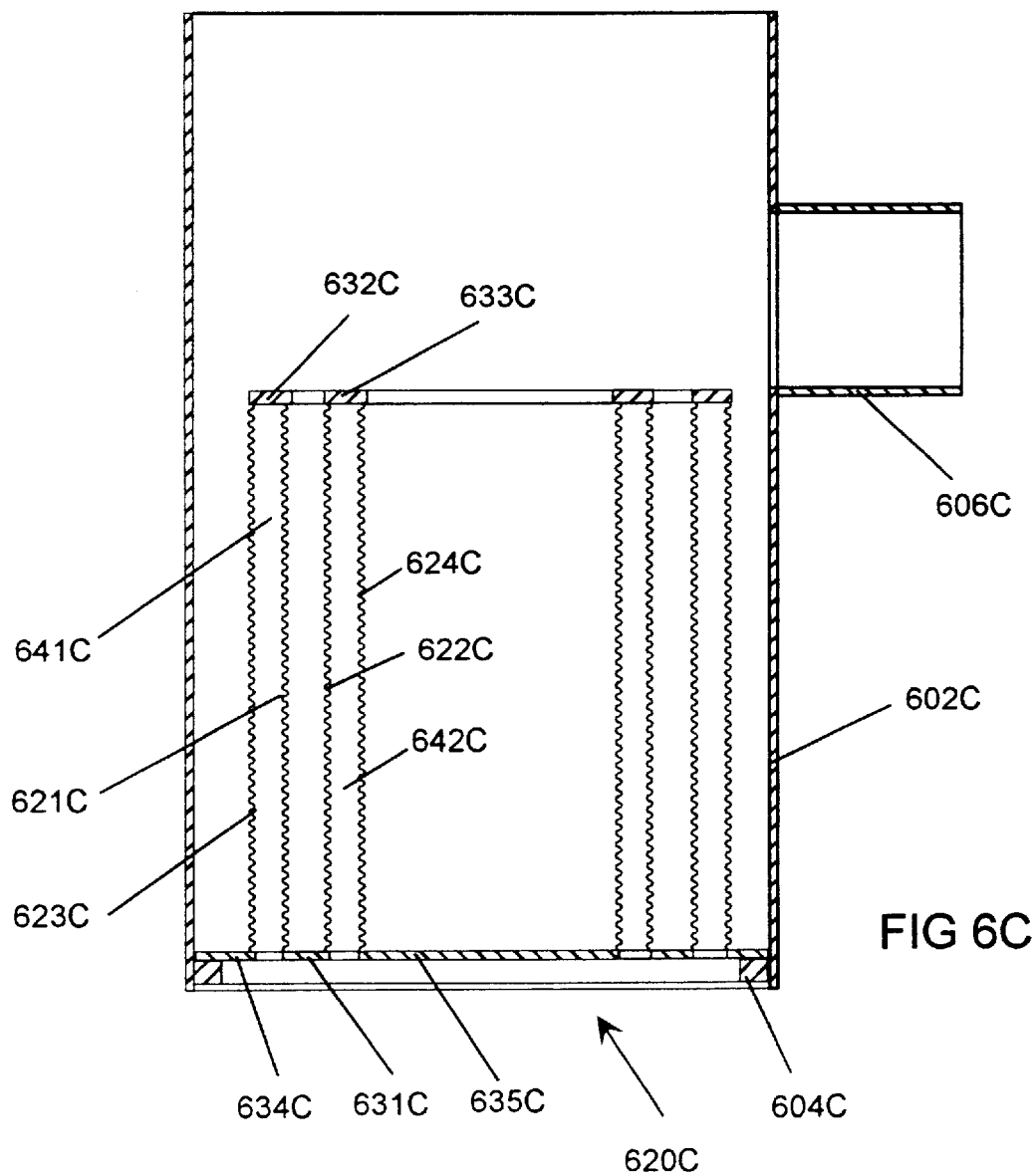

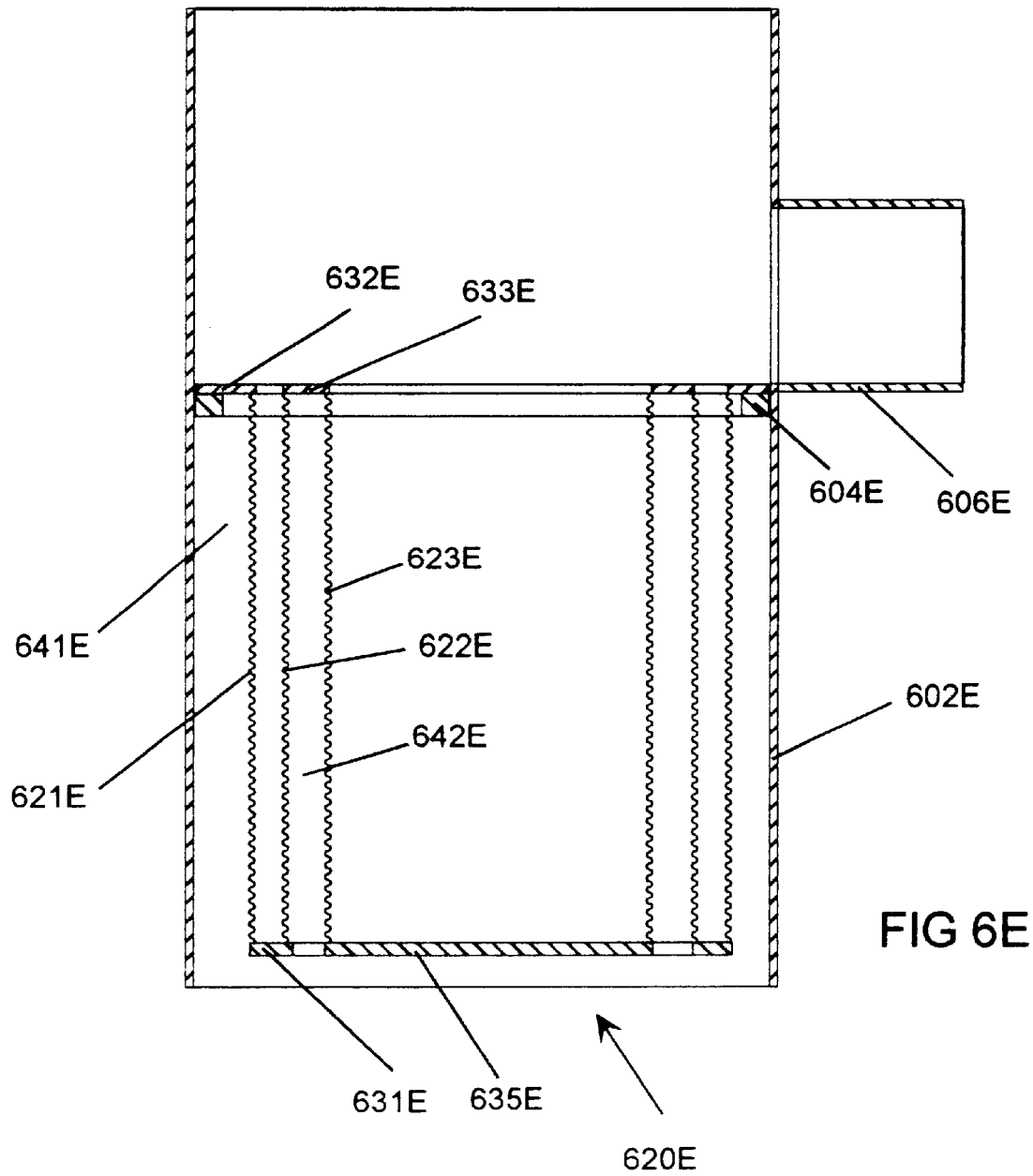

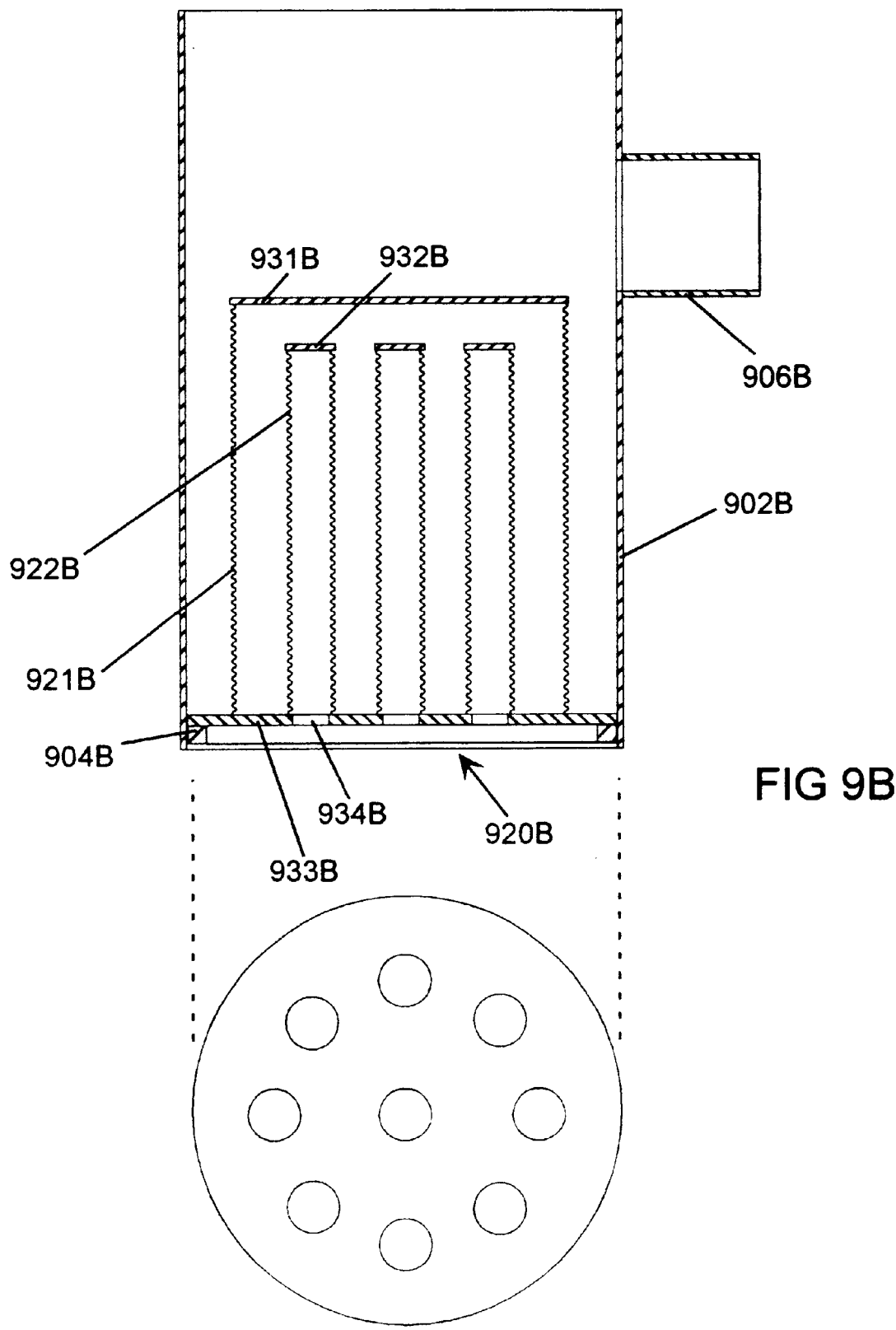

WASTE WATER FILTER HAVING MULTIPLE WALL FILTER ELEMENTS AND OUTLET PROTECTION

This application is a division of U.S. application Ser. No. 09/250,004, filed Feb. 12, 1999, now U.S. Pat. No. 6,416,664.

BACKGROUND

A deficiency of many current septic tank waste water filter designs is the difficulty that arises in servicing the filters. Many waste water filter designs include filter cartridges or elements which are disposed within a housing or shield. Unfiltered waste water enters the shield at inlet locations and must pass through the filter element to proceed to an outlet. In other waste water filter designs, the housing or shield includes apertures or other inlet openings that are sized to restrict the entry of solids that are larger than the openings. In these filter designs, the apertures or inlet openings provide a first filter through which the waste water must pass before advancing through the filter element within the housing and proceeding to the outlet.

In many filter designs, removal of the filter element for servicing leaves the outlet exposed to unfiltered or inadequately filtered waste water. Such filter element removal is periodically required in many waste water filters, particularly in filters not providing self cleaning characteristics, to remove accumulated solids on the filter surfaces and within the housing.

As there is no provision in these filters to restrict the entry of waste water into the filter housing or shield, unfiltered or inadequately filtered waste water will pass unobstructed to the outlet. There are several detrimental effects caused by the passage of unfiltered or inadequately filtered waste water to downstream waste water components as well as to groundwater resources. These detrimental effects are in many cases severe and exist for waste water filters which are gravity flow as well as those which utilize a pump.

In gravity flow filters, solids passing unobstructed through the filter housing to the outlet may accumulate in the modulating orifices in the filter as well as in the outlet pipes causing lower operational efficiencies or blockages. Similar decreases in efficiencies as well as blockages will also occur in sand filters and drain fields as solids accumulate in these waste water system components.

In filters utilizing pumps, unfiltered waste water or inadequately filtered waste water passing unobstructed through the filter housing would enter an outlet reservoir or pump inducer either within the housing or shield or attached to it. These solids may plug and possibly destroy a pump once the pump is activated. Solids which do not plug the pump will be discharged to downstream waste water system components with previously described detrimental effects. In some waste water filters of this type, the outlet opening that feeds the outlet reservoir or pump inducer is beneath the bottom of the filter element. As the filter element is reinstalled after cleaning, the filter element serves to trap solids that have entered into the shield interior at the bottom of the housing or shield. Or, the reinstallation of the filter element will push these solids directly into the outlet reservoir or pump inducer. These solids, having no other exit, will be discharged from the filter through the pump. These solids are responsible for significant damage to pumps as well as causing the previously described problems to downstream system components and downstream water sources.

In some filter designs, particularly filter designs having pump inducers which are attached to the housing or shield, the pump may be allowed to operate while the filter element is removed. In these designs, a large amount of solids could actually be discharged while servicing of the filter element is occurring, if the service technician has not deactivated the pump.

If servicing the filter element requires the deactivation or removal of the pump, solids that have entered into the shield or housing will still be allowed in many instances to pass unobstructed to the pump chamber while the filter element is removed. These solids may accumulate within the shield or pump chamber and be subsequently discharged through the pump causing similar problems to the pump and down stream waste water system components.

Another problem associated with the discharge of unfiltered solids is that undigested solids containing biological hazards would be included within the solids that are inadvertently discharged. These undigested solids pose substantial health threats and have been responsible for illnesses in humans as well as the degradation of wildlife habitat. Accordingly, most waste water regulations are drawn to the discharge of undigested solids.

For the foregoing reasons there is a need for a waste water filter that includes easily removable filter elements that allow for the easy servicing of the waste water filter elements. In these waste water filters there is a need for either ensuring that unfiltered or inadequately filtered waste water will not be discharged from the filter during the servicing of the filter element or restricting the discharge of unfiltered or inadequately filtered waste water. In waste water filters utilizing pumps there is a need that unfiltered or inadequately filtered waste water will not be allowed to enter a pump chamber, or be restricted from entering the pump chamber, while the filter element is removed for servicing or be restricted from entering the pump. This ensures that solids which are known to damage pump components will not be passed through the pump upon activation of the pump.

There is yet another need for a waste water filter that protects downstream waste water treatment system components such as pipes, sand filters, drain fields, and lagoons from inadvertently discharged solids which may accumulate within these components causing decreased operational efficiencies and blockages. There is a further need for a waste water filter that protects ground water supplies from the inadvertent discharge of undigested solids which pose a health hazard to humans and wildlife.

There are also significant deficiencies associated with the filter elements used within current septic tank waste water filter designs.

A first deficiency in existing filter elements is the lack of self cleaning characteristics. Many existing waste water filter elements require the use of a closed bottom shield. In these filters, waste water solids that enter the shield inlet openings have no exit and will accumulate within the shield. Other existing waste water filters use an open bottomed shield which encloses a filter element having multiple stacked disk dam filter sections. The accumulation of solids in these filters is on horizontal surfaces which retain the solids until the element is removed for cleaning. There is no provision for self cleaning in either of these filter designs. Solids will accumulate within the filter during the filtering of waste water. These solids will remain within the filter until they degrade or are removed during a cleaning process. The presence of accumulated solids within the filter results in a decrease in filter efficiency. In many cases, the cleaning will not be performed until plugging is detected.

A second deficiency of existing filters is the difficulty encountered in removing the filter element for cleaning or replacement.

Many existing filters do not allow for the easy removal of the filter element from the shield, and require the entire waste water filter to be removed from the septic tank so that the filter surface or filter element can be cleaned. These filter designs may accumulate a large quantity of solids within the filter. These solids along with the waste water within the filter require the person servicing the filter to lift a substantial amount of weight when removing the filter from the septic tank.

Some existing filters may also restrict the removal process by disposing float switches, pumps, and piping within the interior of the filter element. These filter components must be removed from the element interior before the element can be removed from the shield. Removal of pumps and piping may require the difficult disassembly of threaded fittings.

Another deficiency of previous filter designs is a result of the manner that waste water is supplied to the filter. In either design there is essentially a single route or flow pattern for waste water to proceed into the housing and through the filter. In the past filter designs utilizing a single filter surface, waste water is able to enter the housing at various openings all of which advance the waste water to the same location within the housing and provide the waste water with a single surface such as a screen through which the waste water must pass to be discharged from the tank by a suitable means. In past filter designs using multiple filtering tubes, waste water enters the housing at various openings which are disposed at one or two vertical positions on the housing, which allows the plugging of multiple openings at the same time. Similarly, in the past filter designs utilizing multiple stacked filter elements, waste water enters the housing only at a single location and is then able to proceed through the filter. If the filter surface or filter elements of either system clog, no alternative flow pattern is possible to pass water through the filter. Furthermore, if the single inlet opening of the housing becomes clogged by the eventual upward advancement of the sludge layer or by the eventual downward movement of the scum layer the housing will not provide an alternative flow pattern for the waste water to access the filter.

Yet another deficiency of existing filters is the inability of these filters to provide sequential filtering. In particular, there are few filters which use multiple filter surfaces having a series of progressively smaller filter openings through which the waste water must pass. Sequential filtering is not possible with most existing filters which are of a design having a single filter surface. Because of the single filter surface limitation, there is typically no ability of the filter to remove small solid waste particles from the waste water, as a single filtering surface with small filtering openings would quickly plug.

For the foregoing reasons there is a need for filter elements which provide self cleaning characteristics to the waste water filters in which the filter elements may be used. There is a further need for filter elements which are easily removed for cleaning, as well as a need for filters which allow for the proper placement of pumps and pump switches so that pump removal will typically not be required for filter element servicing. There is yet a further need for filter elements which provide alternative flow patterns, as well as a need for filters which provide sequential filtering.

SUMMARY

The waste water filter of the present invention satisfies the previously mentioned needs for a waste water filter.

The waste water filter of the present invention comprises a shield comprising a vertical peripheral wall defining a shield interior. The shield further comprises an inlet for the entry of unfiltered wastewater into the shield interior. A shield filter element is disposed within the shield interior. An outlet in fluid communication with the filtered waste water within the shield interior for discharging filtered waste water is also included into the waste water filter.

The shield filter element includes at least one filter surface having filter surface openings for the passage of relatively clear water while restricting the passage of solids larger than the openings. The shield filter element, when disposed within the shield, separates the shield interior into first and second interior locations. Unfiltered or partially filtered waste water in the first interior location is separated from filtered waste water in the second location by the shield filter element. The shield filter element is removable from the shield. Unfiltered or partially filtered waste water entering the shield interior after shield filter element removal will enter the first and second interior locations within the shield.

The waste water filter further includes means for preventing the flow of unfiltered or partially filtered waste water from the shield interior from passing through the outlet after the removal of the filter element from the shield.

The means for preventing the flow of unfiltered or partially filtered waste water from the shield interior through the outlet, may comprise an outlet filter which separates the shield interior from the outlet. The outlet filter is typically disposed within the waste water filter independent of the shield filter element. The outlet filter may include filter openings of a larger size than the smallest sized openings of the shield filter element filter surface. The outlet filter may also be included in a waste water filter including a shield filter element which includes a series of filter surfaces through which waste water must pass. The filter openings of the outlet filter in this version would typically be equal to or larger than the last openings of the shield filter element through which the waste water passes before passing through the outlet filter.

The means for preventing the flow of unfiltered or partially filtered waste water from the shield interior from passing through the outlet after the removal of the filter element from the shield may also comprise a gate valve.

The means for preventing the flow of unfiltered or partially filtered waste water from the shield interior from passing through the outlet after the removal of the filter element from the shield may be removable from the waste water filter.

The waste water filter may further include an outlet reservoir disposed intermediate the outlet filter and the outlet. The means for preventing the flow of unfiltered waste water from the shield interior from passing through the outlet after the removal of the filter element from the shield may be removably disposed within the outlet reservoir.

The outlet reservoir may include a vertical peripheral wall which is directly attached to the vertical peripheral wall of the shield. The vertical peripheral wall of the shield may also be partially disposed within the vertical peripheral wall of the outlet reservoir. The outlet reservoir typically includes a discharging means such as a pump.

In another version of the invention, the shield includes an inlet comprising filtering apertures which partially filter the waste water entering into the shield before the waste water passes through the filter element. In this version, an outlet filter or gate valve is used to ensure that solids within the partially filtered waste water do not pass out the filter to the outlet. An outlet filter allows the passage of filtered waste water to the outlet. A gate valve prohibits the passage of any partially filtered waste water to the outlet.

In another version of the invention, the outlet protection is not accomplished by an outlet filter but is provided by the proper placement of the inlet openings which feed waste water to an outlet reservoir. In these waste water filter designs, the inlet opening is placed at a location on the peripheral walls of the shield and outlet reservoir so that a seal on the filter element will force unfiltered waste water away from the opening and either through the filter element or out the filter shield entirely during filter element reinstallation.

The outlet protection provided by this outlet opening location is not as extensive as that provided by outlet filters or valves. However, the design does ensure that a minimum of waste water solids that enter the shield during filter element removal will enter the outlet reservoir to be discharged out the filter.

The present invention provides benefits which previously have not been available in waste water filters.

The use within the present invention of either an additional outlet filter surface, a gate valve, or a properly positioned inlet opening to an outlet reservoir ensures that unfiltered or inadequately filtered solid waste particles, as well as undigested solid waste particles will not be discharged from the filter to downstream waste water system components while the filter cartridge is removed for servicing.

Accordingly, the waste water filter of the present invention ensures that during the period the filter element is removed or as a result of previous filter element removal, the downstream components of a pump, pump vault, outlet lines, sand filter lines, sand filter bed, lagoon or drain field will not be subject to the plugging effect of unfiltered or inadequately filtered solid waste particles.

The present invention also ensures that undigested biological wastes will not be discharged that may eventually enter ground water sources threatening human water supplies as well as wildlife habitat.

The present invention also provides significant benefits to filter elements used in waste water filters.

The present invention addresses the need for a waste water filter to be self cleaning. The waste water filter of the present invention utilizes a shield and filter arrangement wherein the shield is typically constructed with essentially an open bottom. As particles are dislodged from the filter surfaces by the somewhat turbulent flow within the filter the particles are permitted to precipitate out of the first and second interior locations and out the bottomless shield, as well. These particles will then precipitate to the sludge layer at the bottom of the tank. Similarly, solid waste particles that have entered the first and second interior locations and have been digested by biologically active agents in these same locations will also be permitted to exit the shield and precipitate to the sludge layer. The obvious benefits of a self cleaning filter are decreased maintenance costs necessary to clean out or replace a clogged filter.

The present invention further satisfies the need for easy filter element removal. The waste water filter typically uses interchangeable filter elements that are easily installed and removed from the filter shield. The present filter design allows the removal of the filter cartridge by merely lifting upward on the element which extracts the element from the shield. Once removed, the element can be easily cleaned without disassembly of the element. The filter system also allows for the easy replacement of a filter element should the element become damaged or if different filtering characteristics are desired. The waste water filters of the present invention present essentially no difficulty in positioning the filter elements within the shields of the filters. The filter elements can be inserted into the shield until the element abuts the filter element support surfaces within the shield.

The present invention further addresses the need for alternative flow patterns through the filter. The filter typically utilizes two filter surfaces each in fluid communication with a separate interior location within the shield. Both interior locations of the shield contain unfiltered waste water but are in direct fluid communication with each other. This arrangement essentially provides the filter with two flow through patterns within the filter and shield. The first flow pattern being waste water entering into the shield and passing into a first interior location and subsequently through the first filter surface into the interior of the filter. The second flow pattern being waste water entering into the shield and passing into a second interior location and subsequently through the second filter surface into the interior of the filter. This filter arrangement will be unlikely to clog due to the two flow through patterns as both flow through patterns would have to become blocked to restrict the operation of the filter.

This arrangement may also include the added benefit of having unfiltered waste water pass through filter surfaces which have been disposed at different heights. This alternative design allows the solids to first accumulate on the lowest filter surfaces. As the lower filter surfaces lose efficiency due to accumulated solids, the waste water flow through the filter will be transferred to higher filter surfaces. This concept may also prevent an abrupt plugging in the filter as the plugging must occur sequentially on the different height filter surfaces.

The present invention provides filter elements having multiple filter surfaces having progressively smaller openings which allows for a very high level of solids removal while maintaining filter efficiency. As only the largest solids will be filtered by the first filter surface, only the largest of the solid waste particles can accumulate on the first filter surface. Similarly, of the solid particles that are allowed to pass through the first filter surface, only the largest of these particles will be filtered by the second filter surface, and accordingly, only larger particles may accumulate on the second filter surface. For this reason, the use of sequential filter surfaces having progressively smaller filter openings restricts the accumulation of solids on each surface and allows for efficient filter operation while ensuring a higher level of solids removal than is currently available by existing filter designs.

DRAWINGS

FIG. 1C is a side view of an alternative version of the first version of the waste water filter of the present invention FIG. 2A is a side view of a second version of the waste water filter of the present invention.

FIG. 4A is a side view of a fourth version of the waste water filter of the present invention.

FIG. 6C is a side view showing a version of the filter element of the present invention.

FIG. 6E is a side view showing a version of the filter element of the present invention.

FIG. 9B is a side view showing a version of the filter element of the present invention.

DESCRIPTION

Figure 1A:
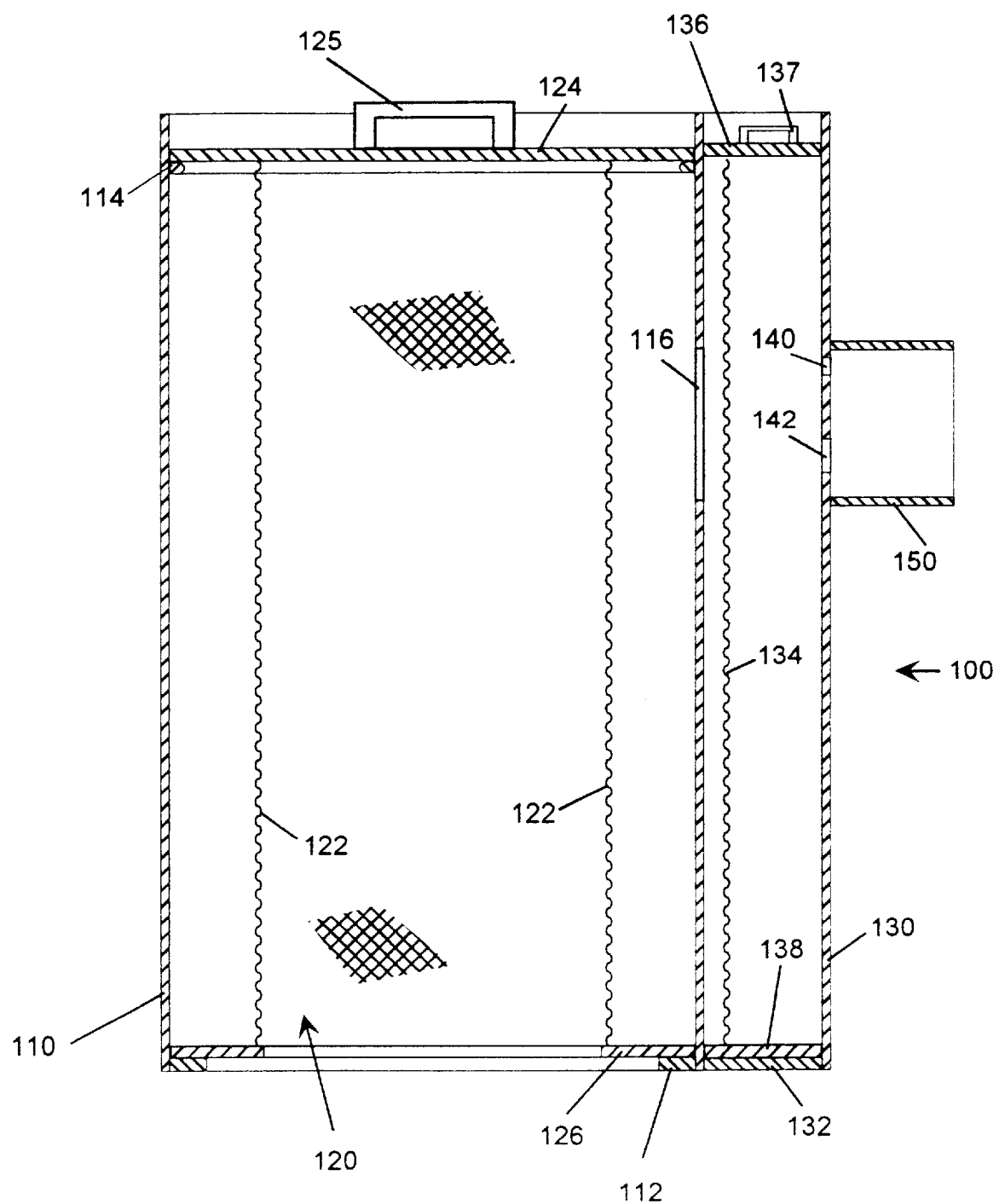
FIG. 1A is a side view of a first version of the waste water filter of the present invention.

FIG. 1A shows a first version of the waste water filter of the present invention. The waste water filter of FIG. 1A is a gravity flow filter which includes an upstanding peripheral wall which is the filter housing or shield 110. Disposed within the filter shield 10 is a filter element support ring 112, and an upper filter element seal 114. This filter shield 110 includes an open bottom for the entry of unfiltered waste water into a first interior location within the shield interior.

Disposed within the shield is a filter element 120 which includes a filter surface of mesh screen or apertured rigid plastic 122 which is supported between an impervious element top 124 and an impervious element bottom 126. The filter surface 122 is a cylindrical, upstanding, peripheral wall which separates unfiltered waste water within a first shield interior location, which is located inside the filter surface peripheral wall, from a second shield interior location, which is outside the filter surface peripheral wall.

Waste water entering the first interior location will typically include undigested solid waste particles which are prevented from passing through the small openings within the filter surface mesh. The filtered waste water will pass out the shield outlet opening 116 into an outlet reservoir within an outlet reservoir wall 130. The outlet reservoir typically includes an impervious wall 130 which may be an entire peripheral wall, or as is shown in FIG. 1A, a partial peripheral wall which is attached to the peripheral wall of the shield to produce an interior reservoir surrounded by a peripheral upstanding wall.

The outlet reservoir further includes an impervious bottom 132. Disposed within the outlet reservoir is an outlet filter surface 134 which is typically a mesh material that includes an outlet filter top 136 having an integral handle 137, and an outlet filter bottom 138.

The outlet filter separates the outlet reservoir into two interior locations. A first outlet reservoir interior location includes the area within which waste water which has not passed through the outlet filter 134 is maintained. A second outlet reservoir interior location is defined by the area within the outlet reservoir within which waste water which has passed through the outlet filter is maintained before passing out of the outlet reservoir.

The outlet reservoir in this version is shown with modulating orifice 142 and vent 140 which modulate the flow of waste water leaving the outlet reservoir into an outlet fitting 150. Modulating orifices are typically large in size compared to the filter openings and accordingly perform no filtering function. Outlet pipe fitting 150 would typically be connected to an outlet pipe which would pass the waste water to downstream septic system components which may include such elements as an additional septic tank chamber, a sand filter, or a drain field.

Although the open bottomed shield allows a self cleaning property to the waste water filter, it is understood that some solid particles will accumulate on the filter surface 122. For this reason, the filter element 120 is removable from the filter shield for cleaning. The filter element 120, which may include a top handle 125 disposed on the element top 124, may be pulled vertically up in relation to the shield 110. The entire filter element, including the filter surface 122, the filter element top 124, and the filter element bottom 126, once extracted from the septic tank may be cleaned of accumulated solids by a suitable method such as the use of pressurized water spray.

The shield interior, which previously was separated into first and second interior locations by the filter element is allowed to fill entirely with unfiltered waste water upon the removal of the filter element 120. During the time the filter element is removed, the outlet filter surface 134 protects the downstream septic system components from unfiltered and undigested solids which would otherwise pass out the filter outlet.

Upon the completion of the filter element cleaning process, the filter element 120 may be easily reinstalled into the shield. During the reinstallation of the element into the shield, the filter element will force most of the unfiltered waste water within the shield interior through the filter surface 122, or force the unfiltered waste water out the open bottom of the shield.

Accordingly, the outlet filter serves as a means for preventing the flow of unfiltered waste water from the shield interior from passing through the outlet during periods when the filter element is removed from the shield.

The outlet filter in this version is also removable for cleaning as it includes a filter surface disposed within the outlet reservoir which includes an attached top 136 and bottom 138. The top includes a handle 137 for allowing the easy extraction of the outlet filter.

Figure 1B:
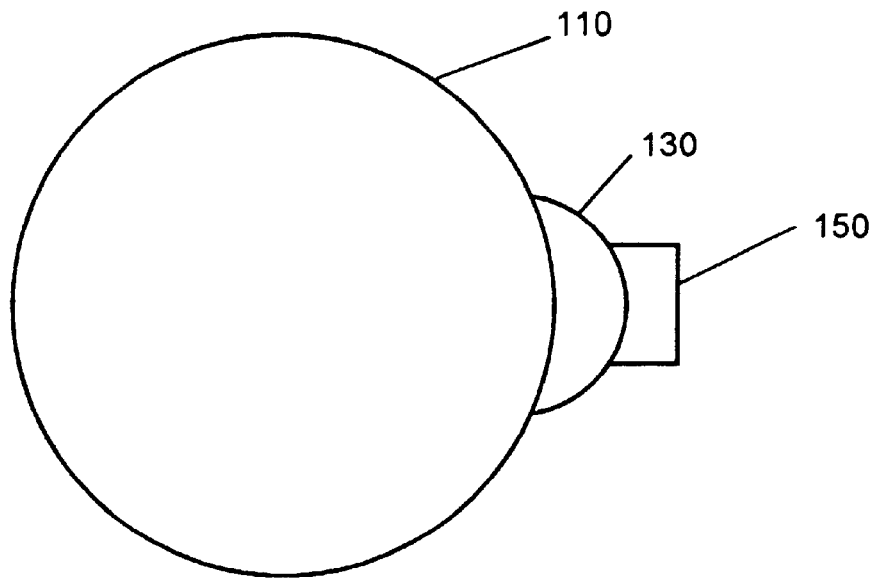
FIG. 1B is a top view of a first version of the waste water filter of the present invention.

FIG. 1B is a top view showing the filter of FIG. 1A once the filter element is removed form the shield.

FIG. 1C shows a second version of the waste water filter of the present invention. In this version, the means for preventing the flow of unfiltered waste water from the shield interior comprises a gate valve disposed within the outlet reservoir. The gate valve includes a gate surface 135. The gate valve, unlike the outlet filter, serves to totally prohibit the flow of any waste water from the filter when the gate is installed within the outlet reservoir. The gate valve thus allows for the removal of the filter element for cleaning while ensuring that no solids will exit the filter. Additionally, the gate would be beneficial for downstream component maintenance, as no waste water would leave the septic tank during the maintenance procedures.

It is understood that the waste water filters of FIGS. 1A, and 1C could include an outlet filter and a gate valve, if desired. Both of these elements could be installed within the outlet reservoir as has been shown for the individual elements. Conversely, either or both of these elements could be installed within the shield interior.

FIG. 2A shows how an outlet filter surface 216 may be disposed within the filter shield 210. In greater detail, FIG. 2A shows a shield 210 comprising an impervious, vertical peripheral wall having an open bottom which serves as the inlet for allowing the entry of unfiltered waste water into a first shield interior location. Waste water entering into a first shield interior location will pass through the filter surface 222 of the filter element 220 into a second interior location. This second interior location is separated from the filter outlet by an outlet filter 216 which in this version comprises a peripheral wall of mesh material or apertured rigid plastic.

The outlet filter surface 216 is disposed at a spaced apart relationship to the interior surface of the shield 210 and is attached to the shield at filter element support 212 and ring seal 214. Filter element support 212 and ring seal 214 are impervious and along with the outlet filter surface 216 serve to define a third shield interior location between the shield interior surface and the outlet filter surface 216.

Waste water having passed through the outlet filter surface 216 will exit the shield interior at outlet opening 218, and then exit out the outlet pipe fitting 250 to downstream septic system components.

Should the filter element 220 require cleaning, the filter element can be removed form the shield by pulling up on the handle 225 disposed on the filter element top 224. The outlet filter surface 216 will remain within the shield and continue to filter the unfiltered waste water that enters into the first and second interior locations through the shield open bottom inlet. In this way, the filtering of waste water continues during filter element servicing.

Although not shown in this figure, a gate valve could be disposed within the outlet pipe fitting next to the outlet opening 218. Such a gate valve would allow the flow of filtered waste water leaving the filter to be stopped entirely. The filter could also use an outlet reservoir, as well, if desired.

Figure 2B:
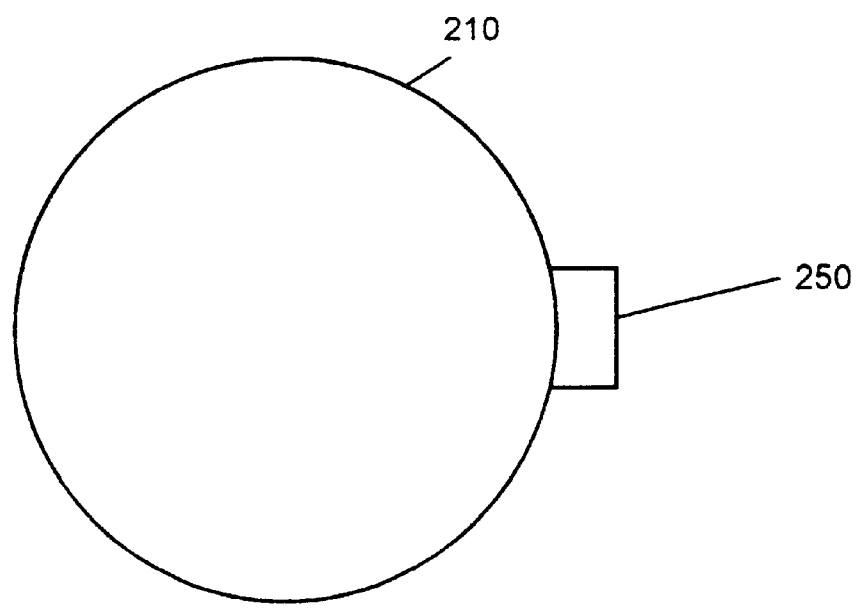
FIG. 2B is a top view of the waste water filter of FIG. 2A.

FIG. 2B is a top view showing the filter 200 after filter element removal.

Figure 3A:
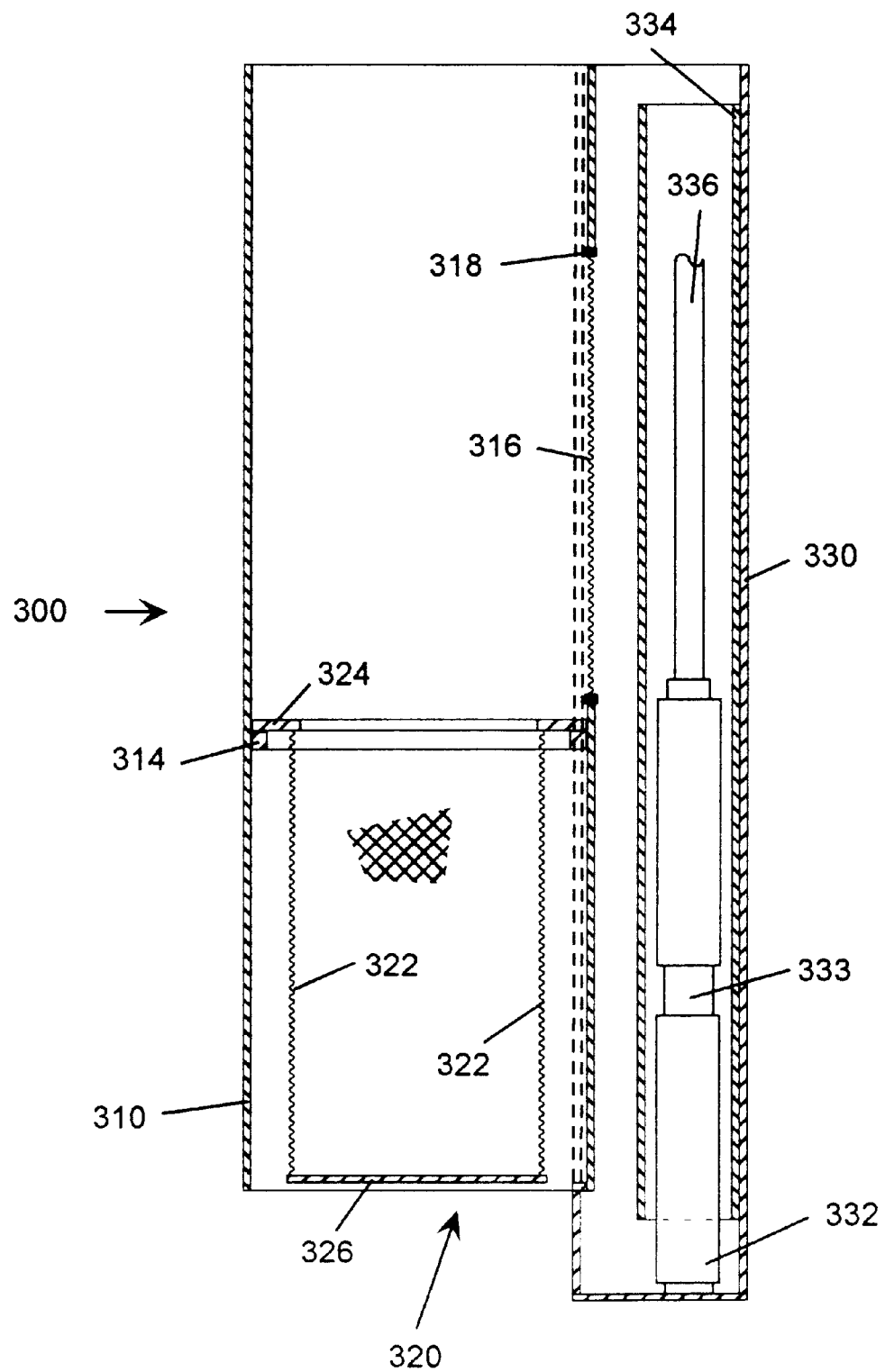
FIG. 3A is a side view of a third version of the waste water filter of the present invention.

FIG. 3A shows a fourth version of the present invention. In this version, an outlet filter surface 316 is supported on the shield peripheral wall at a location where the outlet reservoir wall 330 overlaps the shield peripheral wall 310.

In greater detail, FIG. 3A shows a waste water filter 300 including a shield 310 comprising an impervious vertical peripheral wall having an open bottom which serves as the inlet into the shield interior. A filter element 320 is disposed within the filter shield interior. The filter element includes a filter surface 322 of mesh material or apertured rigid plastic, a filter element top 324, and a filter element bottom 326.

Waste water entering into a first shield interior location, outside the filter surface 322, passes through the filter surface 322 into the second shield interior location. The waste water in the second shield interior location must pass through an outlet filter surface 316 to pass out of the shield into an outlet reservoir, which serves as a pump vault. The outlet filter is disposed within an opening in the vertical peripheral wall of the shield 310 by a peripheral seal 318.

The waste water which has passed through the outlet filter will be incrementally discharged to downstream system components by an incremental discharge apparatus which in this case is a pump 332. The pump is disposed within a pump inducer 334 which is a vertical peripheral wall having a bottom opening. The bottom opening is proximate to the pump bottom and the outlet reservoir bottom.

Waste water in the outlet reservoir will enter a pump inlet 333 after having entered the open bottom of the pump inducer 334. As the waste water moves toward the pump inlet 333, the motor of the pump is cooled by the passage of water over the pump housing. The pump discharges waste water through an outlet pipe 336.

The outlet filter 316 serves to protect the pump as well as the downstream system components of waste water solids when the filter element is removed for servicing.

Figure 3B:
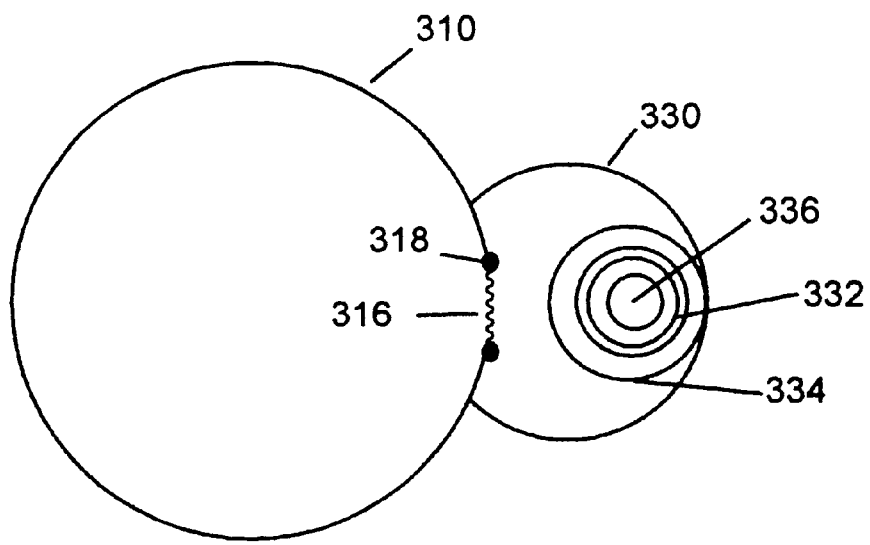
FIG. 3B is a top view of a third version of the waste water filter of the present invention.

FIG. 3B is a top view of the fourth version of the present invention 300 shown in FIG. 3A.

FIG. 4A is a side view showing a waste water filter 400 which is a modified version of the filter element of FIGS. 3A and 3B. The waste water filter 400 includes four filter elements 420A, 420B, 420C, and 420D each of which are attached to an outlet reservoir 430. Only filter elements 420A and 420C are shown in the FIG. 4A. Outlet filters 416A, 416B, 416C, and 416D serve to prevent unfiltered waste water solids from entering the outlet reservoir 430 and damaging the pump 432 or other downstream system components.

Figure 4B:
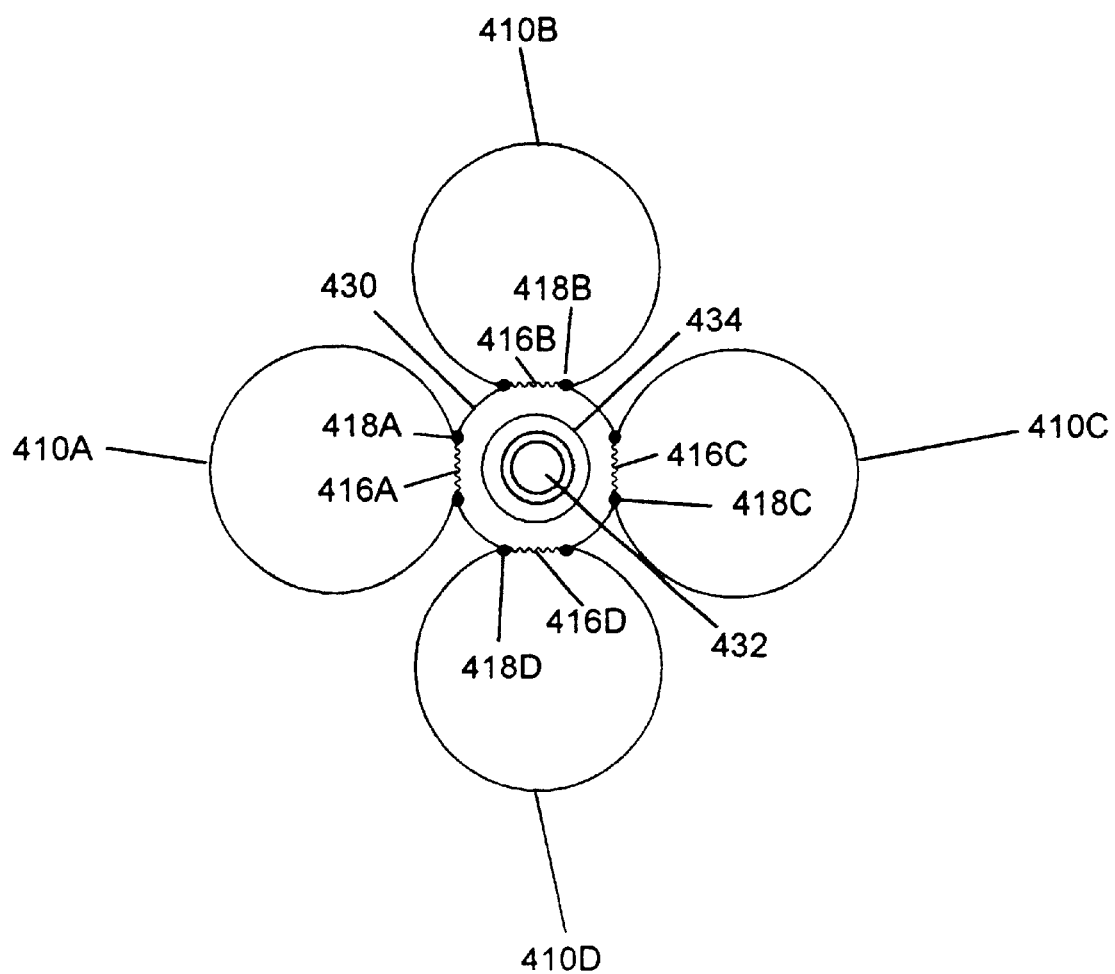
FIG. 4B is a top view of a fourth version of the waste water filter of the present invention.

FIG. 4B is a top view of the version of the invention 400 shown in FIG. 4A.

Figure 5B:
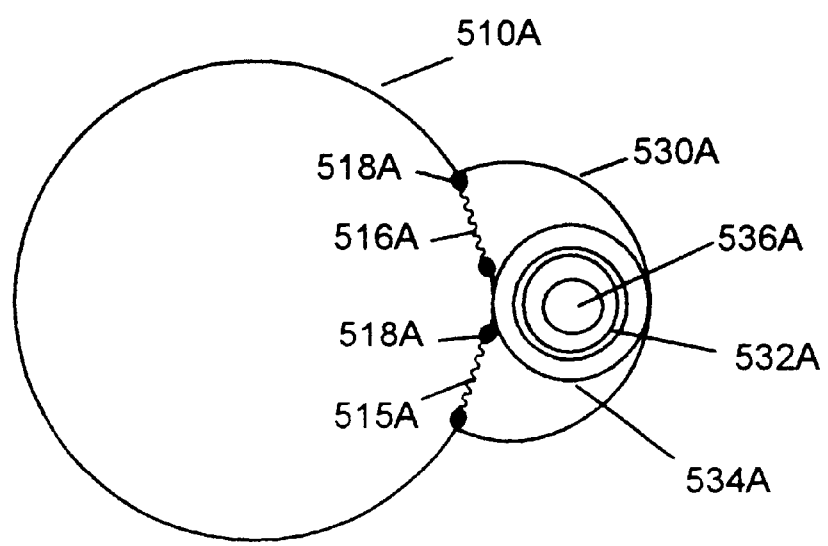
FIG. 5B is a top view of a fifth version of the waste water filter of the present invention.
Figure 5A:
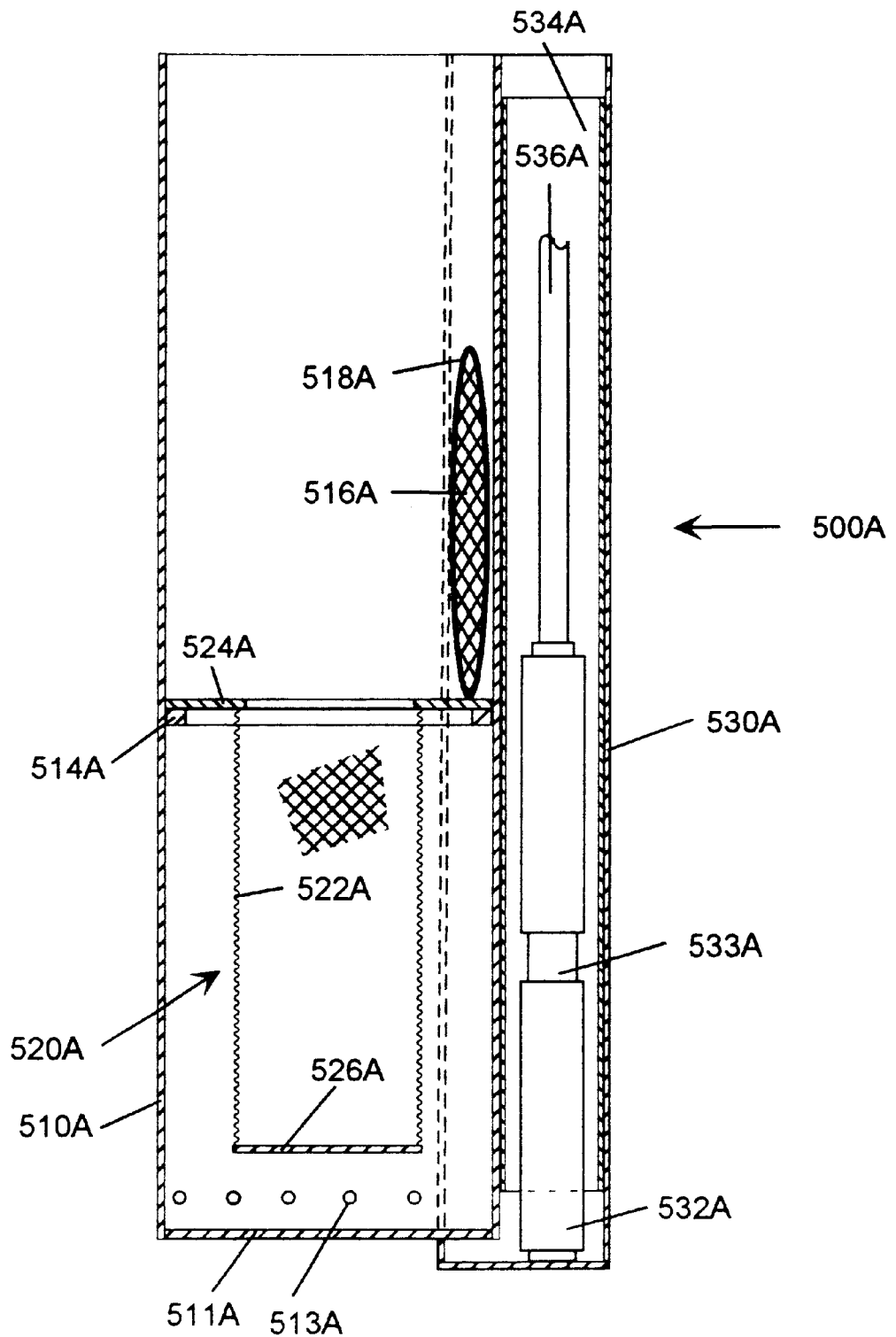
FIG. 5A is a side view of a fifth version of the waste water filter of the present invention.

FIG. 5A is a side view of a sixth version of the waste water filter 500A of the present invention. In this version, the shield includes filtering inlet orifices 513A. Filtering inlet orifices 513A provide a first filtering surface through which waste water must pass. The filtering inlet orifices allow partially filtered waste water to enter a first shield interior location. The waste water then passes through the filter surface 522A of the filter element into a second shield interior location. The waste water within the second interior location must pass through one of the two outlet filters 516A and 515A (not shown) to proceed to an outlet reservoir.

The outlet reservoir comprises a vertical wall 530A attached to the vertical peripheral wall 510A of the shield. Disposed within the outlet reservoir is an open bottomed pump inducer 534A within which a pump 532A having an inlet 533A and an outlet 536A are located.

Outlet filters 516A and 515A (not shown) prevent inadequately filtered waste water, which has entered the shield interior through the filtering inlet orifices 513A, from passing though the filter to the outlet reservoir while the filter element is removed.

FIG. 5B is a top view of the version of the present invention 500A shown in FIG. 5A. FIG. 5B shows the first and second outlet filters 516A and 515A.

The openings within the outlet filter of any of the previous version may be of a size which is larger or smaller than the openings within the filter element. A larger opening would ensure that few solids accumulate on the outlet filter to prevent a flow blockage from occurring at the outlet filter. This would protect a pump from the damage caused by running dry.

Alternatively, the openings within the outlet filter may be smaller than those of the filter element, so as to provide a progressively smaller series of filter surfaces through which waste water must pass.

FIGS. 5C through 5G show different versions of the invention where a passive outlet protection is used. The structure of the filters of FIGS. 5C through 5G are in many ways similar to that shown for FIGS. 5A and 5B. In each of these version, a removable filter element is disposed in the shield and includes at least one horizontally disposed seal. The filter element seals separate waste water which is unfiltered by the filter element in a first shield interior location from filtered waste water in a second shield interior location. The seals further ensure that the unfiltered waste water in the first interior location must pass through the filter openings within the filter element to pass into the second shield interior location.

Attached to the shield is an outlet reservoir. The outlet reservoir includes a vertical peripheral wall within which an inlet opening is disposed that allows filtered waste water to pass from the second shield interior location to pass into the outlet reservoir. Disposed within the outlet reservoir is an incremental discharge apparatus which typically comprises a pump which is disposed within an inducer. Alternatively, a centrifugal pump or dosing siphon could be used.

In each of the filter designs of FIGS. 5C–5G, the seal or seals perform the function of forcing unfiltered waste water, which has entered into the shield interior locations, through the filter element as the filter is reinstalled in the shield, or pushing the unfiltered waste water out the shield inlet. In each of the filter designs of FIGS. 5C–5G an inlet opening to the outlet reservoir is disposed on a vertical peripheral wall in such a way as to minimize the introduction of unfiltered waste water into the outlet reservoir during filter element removal and after filter element reinstallation.

Figure 5C:
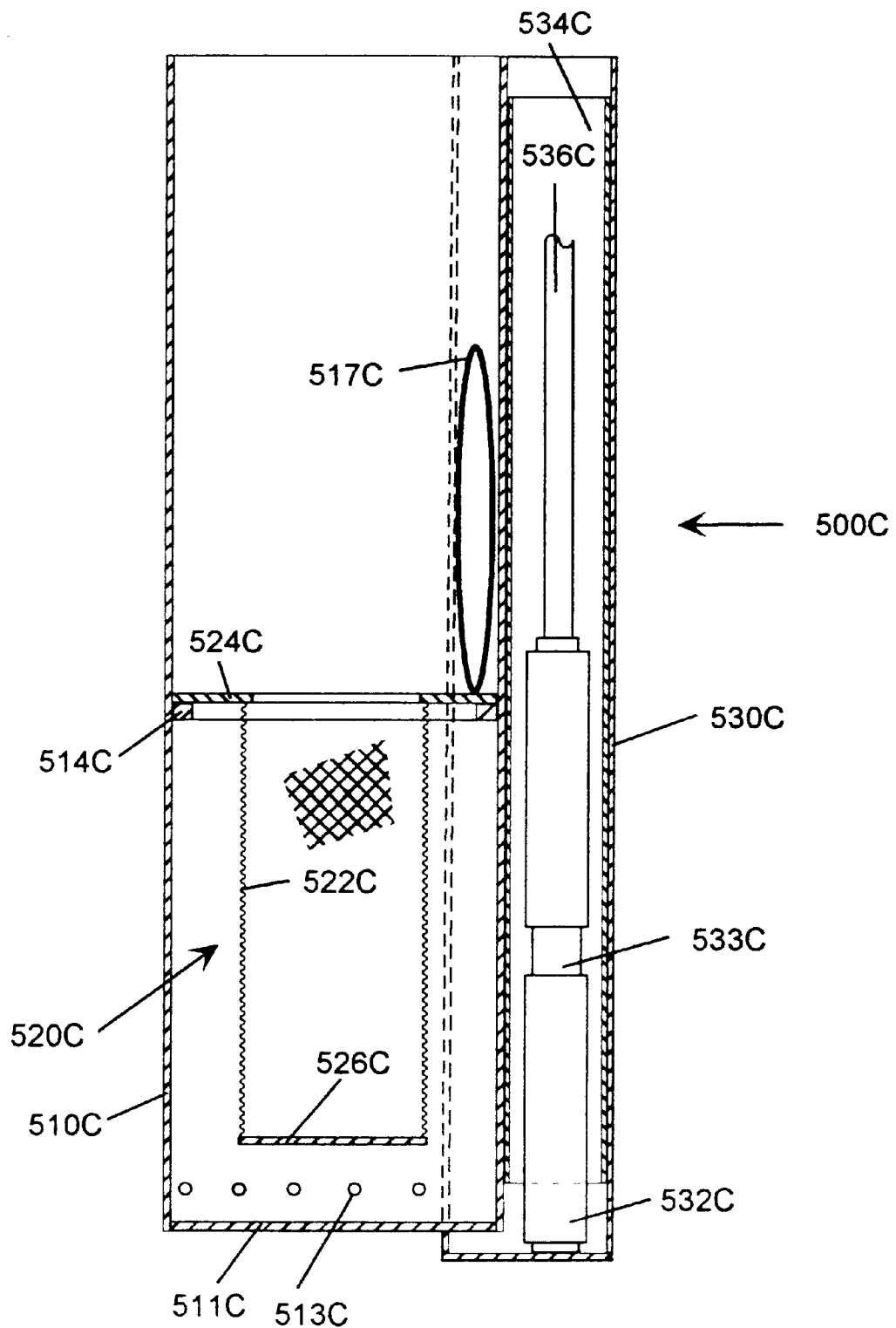
FIG. 5C is a side view of a sixth version of the waste water filter of the present invention.

FIG. 5C shows a filter element 520C including a peripheral wall 522C which includes filter openings, a bottom plate 526C and ring seal 524C. Ring seal 524C forms a seal with the interior surface of the shield 510C as well as with the filter element support 514C. Filtering inlet openings 513C allow partially filtered waste water into the first shield interior location which is the region outside the peripheral wall 522C of the filter element. Waste water passing through the filter element peripheral wall 522C passes into the second shield interior location. This filtered waste water then passes through the opening 517C in the portion of the shield peripheral wall 510C which is overlapped by the peripheral wall of the outlet reservoir 530C which thus comprises a portion of both the shield and the outlet reservoir peripheral walls. This filtered waste water passes to the bottom of the outlet reservoir where it will enter the open bottom of the inducer 534C and then be discharged through the pump. It is possible that the outlet reservoir would not include an inducer but would instead be sized to properly fit the pump.

The filter element seal 524C is disposed below the inlet opening 517C into the outlet reservoir. Accordingly, upon filter element reinstallation, after the filter element has been removed for cleaning, the seal will push unfiltered waste water downward causing the unfiltered waste water to either exit the shield inlet openings or pass through the filter openings of the filter element. Thus waste water which had entered into the shield second interior location will be filtered by the filter element as the element is reinstalled back into the shield. The filter element is fully reinstalled when the seal abuts the filter element support 514C. At this position the seal is below the opening 517C. Only a very small amount of waste water which is unfiltered by the filter element is permitted to pass into the outlet reservoir during the period the filter element is removed. Because of this, very few waste water solids can be discharged from the filter outlet as a result of filter element removal.

Figure 5D:
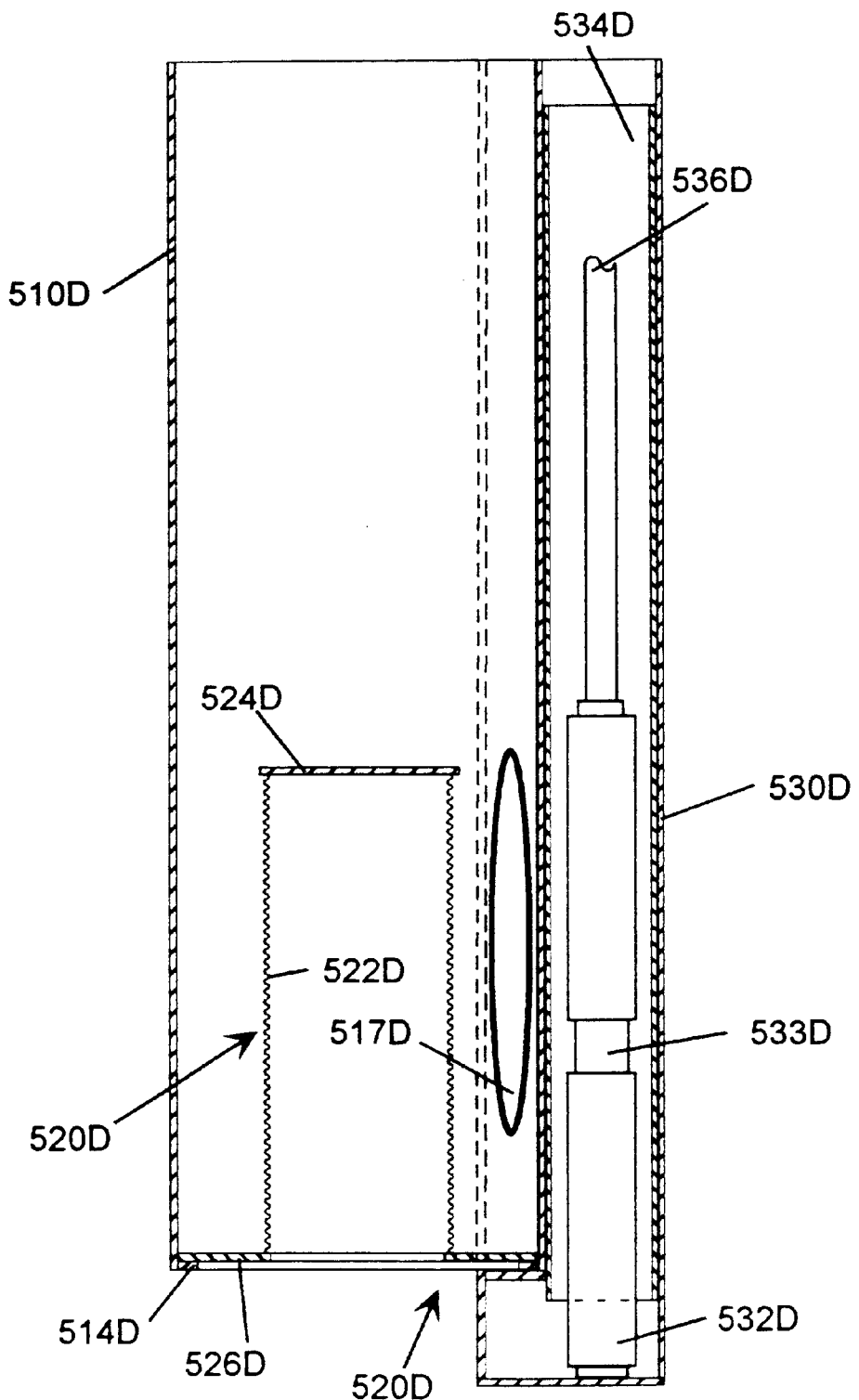
FIG. 5D is a side view of a seventh version of the waste water filter of the present invention.

FIG. 5D shows a very similar filter to that of FIG. 5C. In this version, the seal 532D is disposed at the bottom of the filter element adjacent to the inlet opening 517D into the shield. The inlet opening 517D into the outlet reservoir 530D is disposed on a lower portion of the shield and outlet filter peripheral walls. The inlet opening is disposed vertically above the seal 532D so that reinstallation of the filter element 520D causes unfiltered waste water to exit the shield or pass through the filter element 520D. Waste water solids will accordingly be pushed out the shield during reinstallation of the filter element.

Figure 5E:
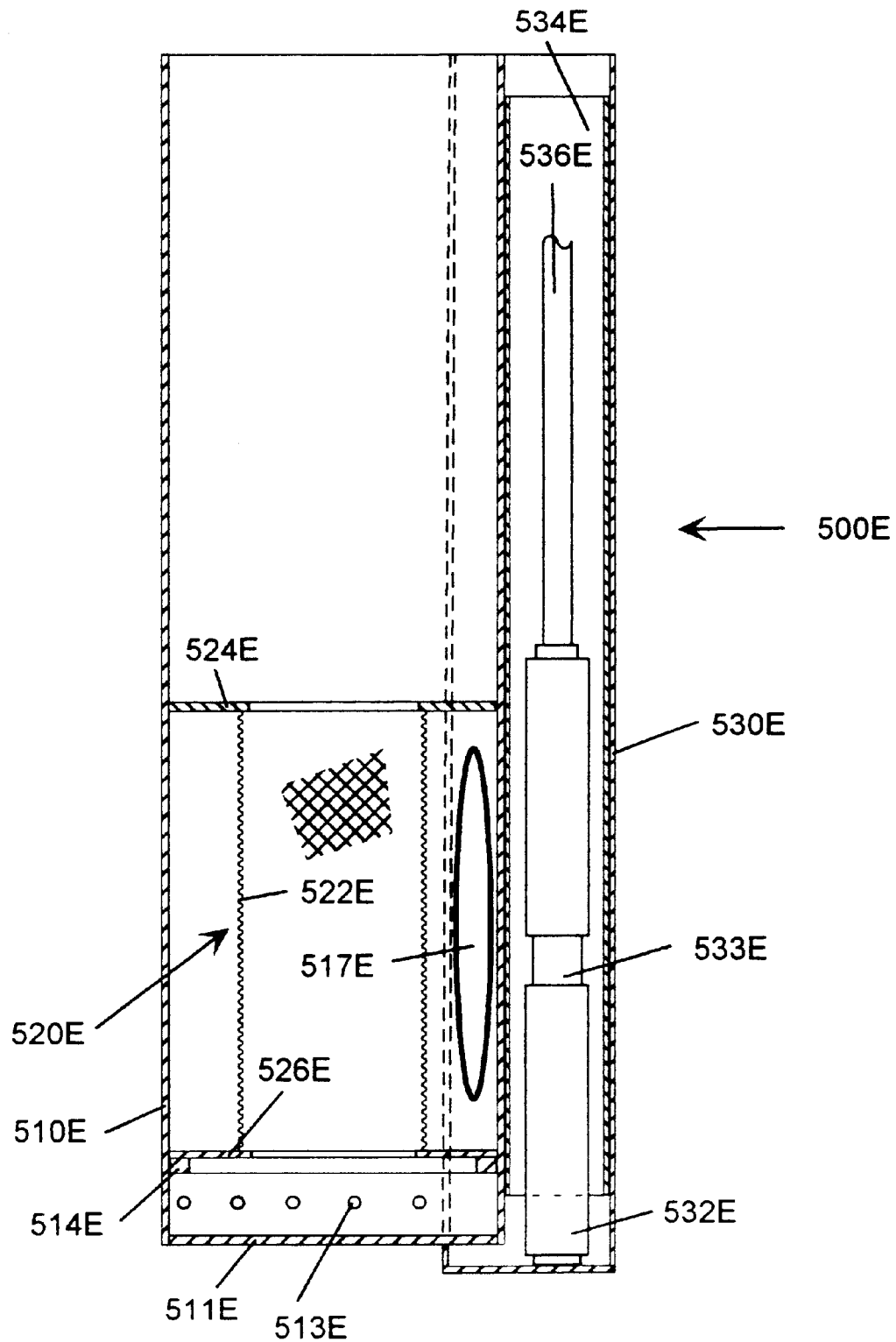
FIG. 5E is a side view of a eighth version of the waste water filter of the present invention.

FIG. 5E shows a filter element 520E including a first top seal 524E and a second bottom seal 526E. Waste water partially filtered by the filtering inlet openings 513E, but unfiltered by the filter element, enters the shield into the shield first interior location. This waste water can pass through the filter openings of the peripheral wall 522E. Once having passed through the filter element, the filtered waste water will pass into the outlet reservoir through the inlet opening 517E which is disposed between the top and bottom seals.

Here again, reinstallation of the filter element results in the seal 526E pushing unfiltered waste water downward so that very little unfiltered waste water will remain in the shield second interior location to be passed into the outlet reservoir and discharged out the filter.

Figure 5F:
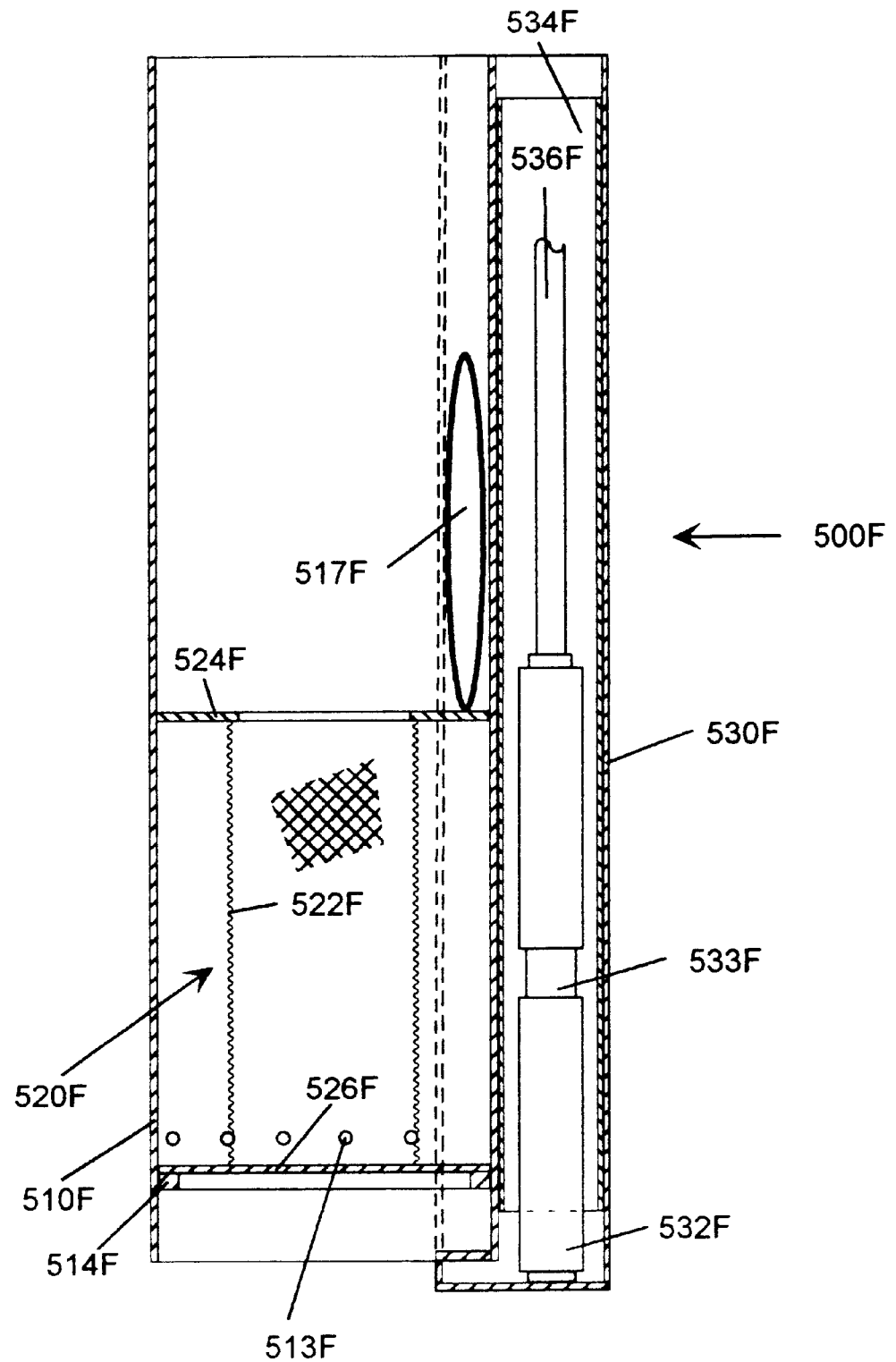
FIG. 5F is a side view of a ninth version of the waste water filter of the present invention.

FIG. 5F shows a filter element 520F which also includes a first top seal 524F a second bottom seal 526F and a vertical peripheral wall 522F. Waste water enters into the shield first interior location through the filtering inlet openings 513F. This waste water passes through the peripheral wall 522F into the second interior location where the waste water can pass into the outlet reservoir through inlet opening 517F.

The reinstallation of the filter element 520F after removal and cleaning results in the bottom seal plate 526F pushing unfiltered waste water out the open bottom shield. The filter element is full reinstalled when the filter element bottom seal plate 526F abuts against the filter element support 514F and the top seal 524F is below the opening 517F.

Figure 5G:
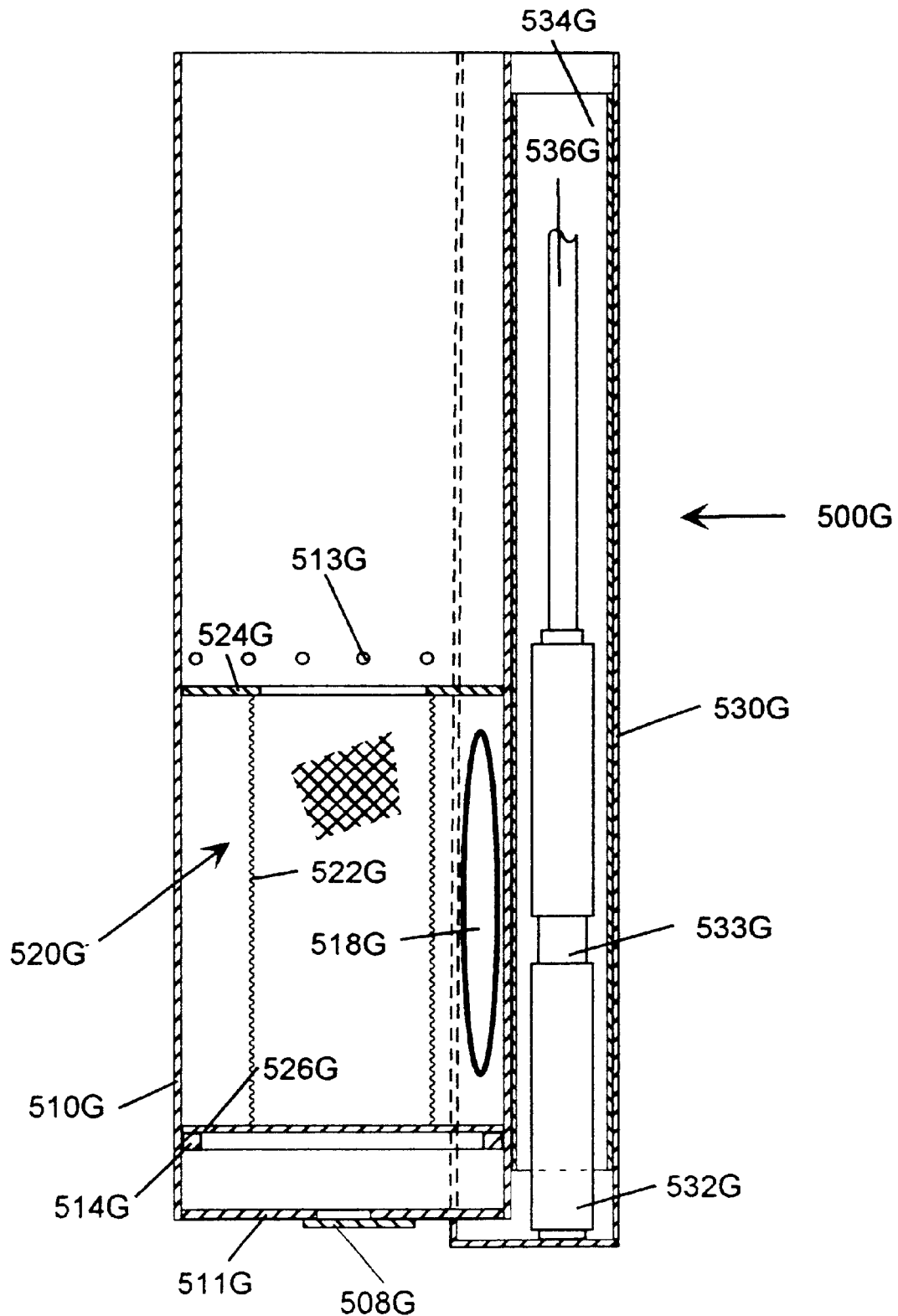
FIG. 5G is a side view of a tenth version of the waste water filter of the present invention.

FIG. 5G shows a filter element 520G where the filter element includes a single top seal 524G, a bottom seal plate 526G and a vertical peripheral wall 522G. Waste water enters into a shield first interior location through filtering inlet openings 513G. This waste water then passes through the filter openings within the peripheral wall 522G into a second shield interior location. The waste water then passes through an inlet opening 517G located intermediate the top and bottom seals into the outlet reservoir.

Reinstallation of the filter element after cleaning results in the bottom seal plate 526G pushing inadequately filtered waste water out the shield bottom through the check valve 508G. Alternatively, the shield could have included an open bottom such as was disclosed in FIG. 5F as the check valve and open bottom are interchangeable. A check valve could have been used in previous versions 5C and 5E, as well, as it can assist in ease of filter reinstallation and will not allow unfiltered waste water to enter. Any inadequately filtered waste water remaining below the seal plate 526G would not be allowed to pass out the filter while the filter element is in place within the shield.

It is also possible that the filter element 520G would include a bottom plate seal that would seal the bottom of the filter element but would not form a seal with the interior of surface of the shield.

The filter elements shown in FIGS. 1–5 have been shown as simply as possible with single filtering surfaces. This was done so as not to detract from the new structure of the shield, outlet filter, gate valve and outlet reservoir of the present invention. However, it is understood that many different filter element configurations are usable within the shield of the present invention. Any waste water filter element would benefit from the addition of an outlet filter or gate valve as taught by the present invention. Possible current filter elements which would be usable within the shield of the present invention include those constructed with apertured rigid plastic, mesh screen, mesh screen tubes, vertically stacked disk dams, and vertically stacked mesh filter structures. It is also understood that the outlet filter could be located within the shield at a position separating an upper filter element chamber from a lower outlet chamber which may or may not include a pump.

Figure 6A:
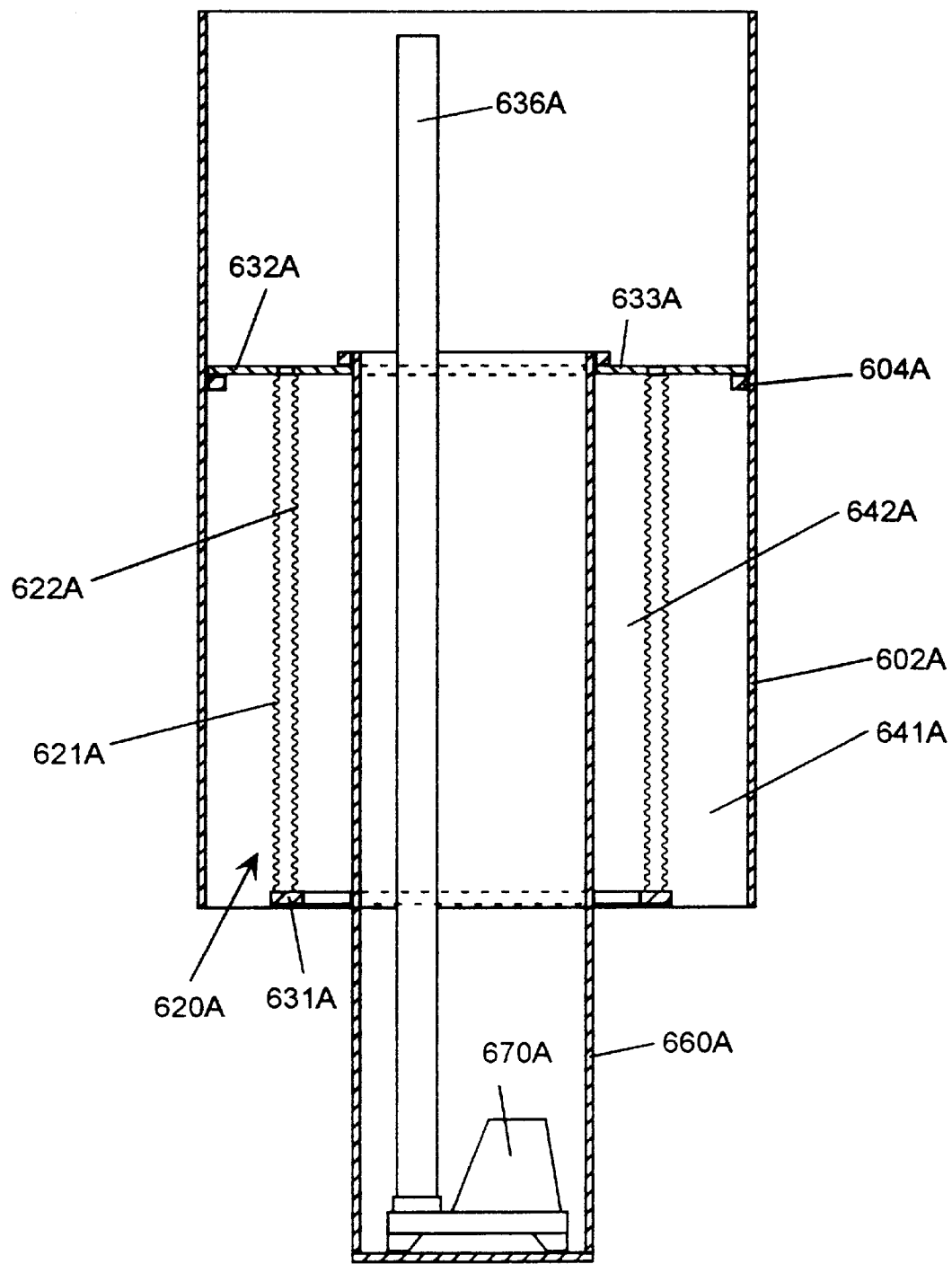
FIG. 6A is a side view showing a version of the filter element of the present invention.

FIG. 6A shows a waste water filter including a first version of the filter element 620A of the present invention. A waste water filter similar to this version was previously disclosed in U.S. Pat. No. 5,635,064 which is incorporated herein by this reference.

The waste water filter includes an open bottomed shield 602A comprising a vertically disposed peripheral wall substantially in the shape of a cylinder. Disposed on the interior surface of the shield is a filter support ring 604A. Supported by the filter support ring within the shield is a filter element 620A which includes a first peripheral wall 621A and a second peripheral wall 622A disposed within the first peripheral wall at a predetermined spaced apart distance therefrom. The first peripheral wall is also disposed at a spaced apart distance from the interior surface of the shield. The first and second peripheral walls of the filter element include filtering surfaces which may comprise a mesh screen or other suitable filtering material.

A shield interior location 641A separates the first peripheral wall 621A from the interior surface of the shield 602A. The second peripheral wall 622A is shown at a spaced apart distance from the peripheral wall 660A of an outlet reservoir. A second shield interior location 642A separates the second peripheral wall 622A from the peripheral wall 660A of the outlet reservoir. Waste water which has entered into the shield interior is maintained within the first and second shield interior locations 641A and 642A. This waste water is unfiltered if the shield inlet comprises an open bottom as is shown in this figure. If the shield inlet comprises filtering orifices within the peripheral wall of the shield, waste water which is partially filtered by the filtering orifices but unfiltered by the filter element is maintained within the first and second shield interior locations 641A and 642A.

The first peripheral wall 621A and second peripheral wall 622A are attached together at their bottom edges by a ring 631A which prevents unfiltered waste water from entering into the intervening area between the first and second peripheral walls. The filter element further includes a ring 632A attached to the first peripheral wall and a ring 633A attached to the second peripheral wall 622A. Rings 632A and 633A may be attached together. The ring 632A forms a seal with the interior surface of the shield, the ring 633A forms a seal with the wall of the outlet reservoir 660A. The rings prevent unfiltered waste water from penetrating further into the waste water filter without passing through the filter surface of the first or second peripheral walls. The ring 632A is supported on the filter element support 604A. Unfiltered waste water in interior location 641A may pass through the filter surfaces of the first peripheral wall 621A. Unfiltered waste water in interior location 642A may pass through the filter surfaces of the second peripheral wall 622A. The filtered waste water which has passed through any of the filtering surfaces of the two peripheral walls will advance through the shield interior to the outlet reservoir 660A.

Figure 6B:
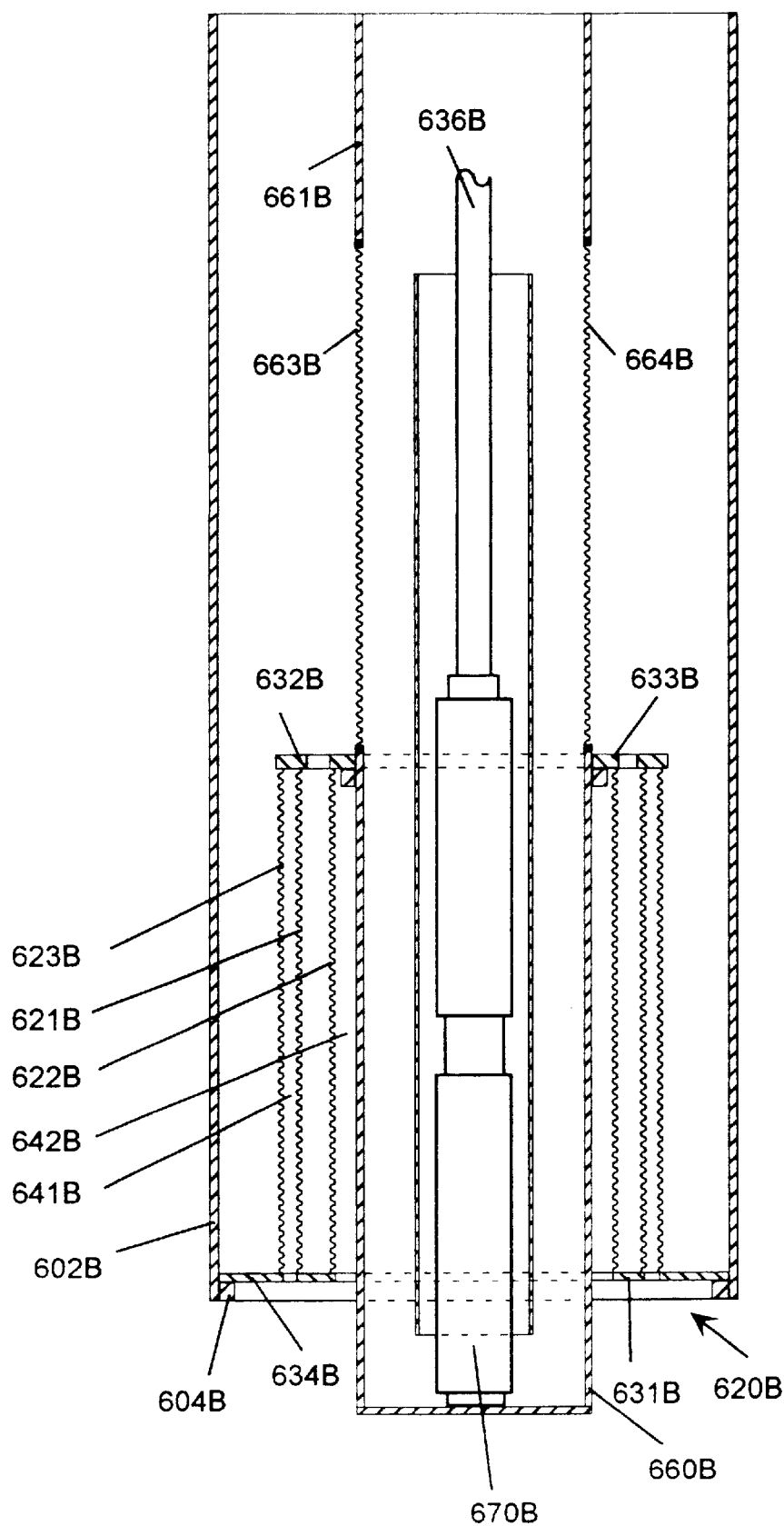
FIG. 6B is a side view showing a version of the filter element of the present invention.

FIG. 6B is a side view of the waste water filter of the present invention including a second version of the filter element 620B. The filter element 620B includes a first peripheral wall 621B, a second peripheral wall 622B, and a third peripheral wall 623B. All three of the peripheral walls include an appropriate filtering means such as a mesh screen material. The top of the third peripheral wall is attached to the top of the first peripheral wall by ring 632B. A ring 634B seals the bottom of the third peripheral wall to the interior surface of the shield 602B. The ring 634B rests on the filter element support 604B.

Waste water entering into the first interior location 641B can pass through the filter surface of the first peripheral wall 621B or the third peripheral wall 623B. Waste water entering the second interior location 642B may only pass through the second peripheral wall 622B. The filtered waste water which has passed through any of the filtering surfaces of the three peripheral walls will advance through the shield interior to the outlet reservoir 660B. The outlet reservoir peripheral wall 661B includes outlet filters 663B and 664B which prevent unfiltered waste water from entering into the outlet reservoir if the filter element has been removed from the shield for cleaning. A pump 670 is shown within the outlet reservoir.

FIG. 6C shows the waste water filter including another version of the filter element 620C. Filter element 620C includes a fourth peripheral wall 624C in addition to the first, second and third peripheral walls 621C, 622C, and 623C. Ring 631C attaches the bottom edges of peripheral walls 621C and 622C together. Ring 632C attaches the top edges of peripheral walls 621C and 623C together. Ring 633C attaches the top edges of peripheral walls 622C and 624C together. Ring 634C forms the seal between peripheral wall 623C and the interior surface of the shield. Plate 635C closes the bottom of the peripheral wall 624C. Rings 631C, 632C, 633C, 634C, and plate 635C all serve to ensure that unfiltered waste water which has entered into the interior locations 641C and 642C will not pass further into the shield interior without passing through the screen mesh or other filtering means of the peripheral walls.

Figure 6D:
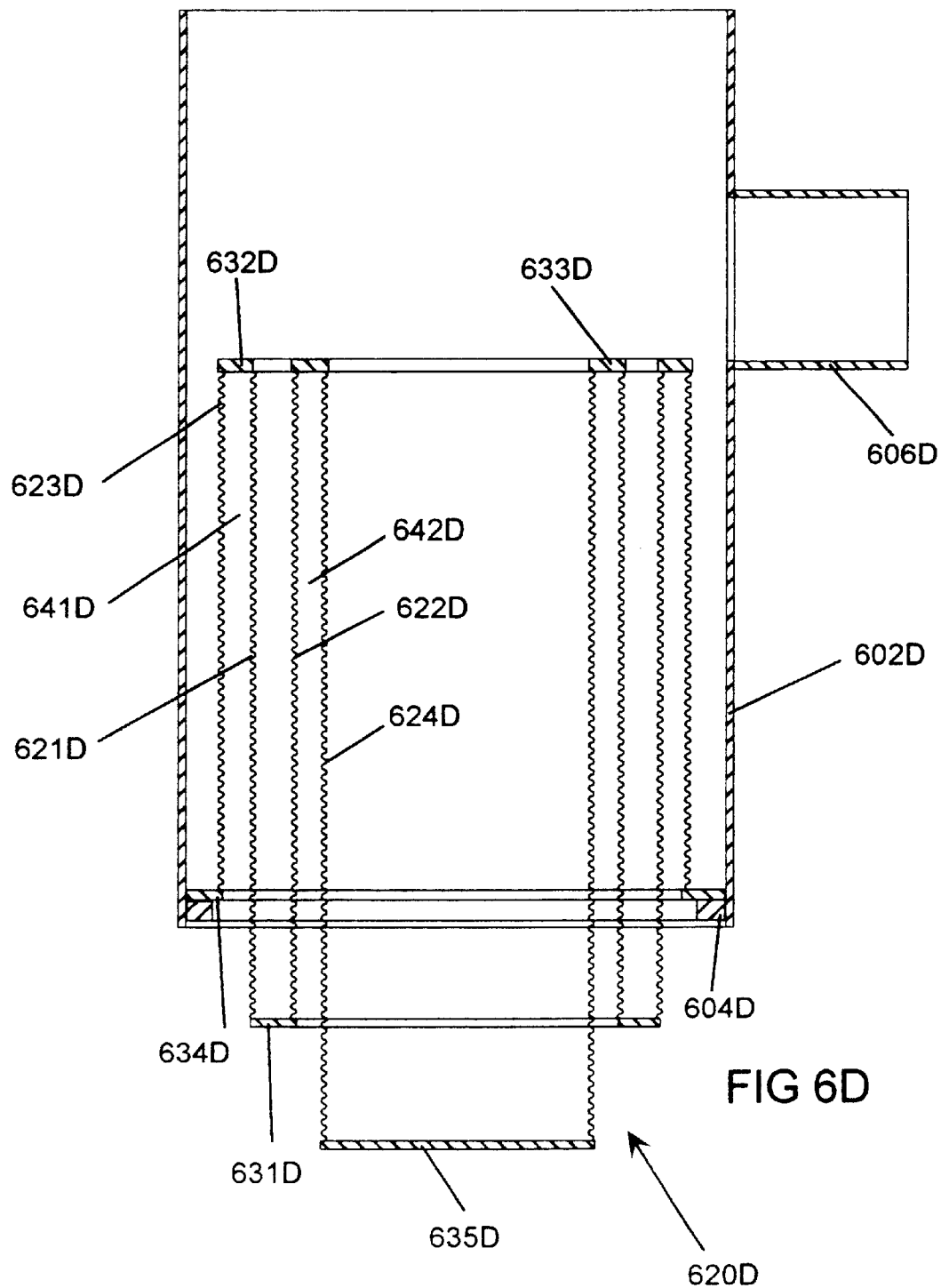
FIG. 6D is a side view showing a version of the filter element of the present invention.

FIG. 6D shows an alternative version of the filter element shown in FIG. 6C. FIG. 6D shows a peripheral wall 623D being shorter than peripheral walls 621D and 622D. Peripheral wall 624D is shown being longer than peripheral walls 621D and 622D, and extends to a lower vertical position relative to the shield 602D. The peripheral wall 624D actually extends beneath the open bottom of the shield to a lower position within a septic tank. This may assist in volumetric efficiency of the filter. It is also understood that the peripheral walls which are disposed at different vertical positions would have different solid waste accumulation rates due to the different solid concentrations at different vertical positions within the septic tank. This variance in solid accumulation would necessarily lead to plugging of the filtering surfaces at different times which may avoid a catastrophic abrupt plugging of the entire waste water filter.

FIG. 6E shows a filter element 620E where a third peripheral wall 623E is disposed within the second peripheral wall. The top edge of the third peripheral wall 623E is attached to the top edge of the second peripheral wall 622E by ring 633E. The region within the vertical peripheral wall 623E is closed to unfiltered waste water by the bottom plate 635E which is attached to the entire bottom edge of peripheral wall 623E.

Figure 6F:
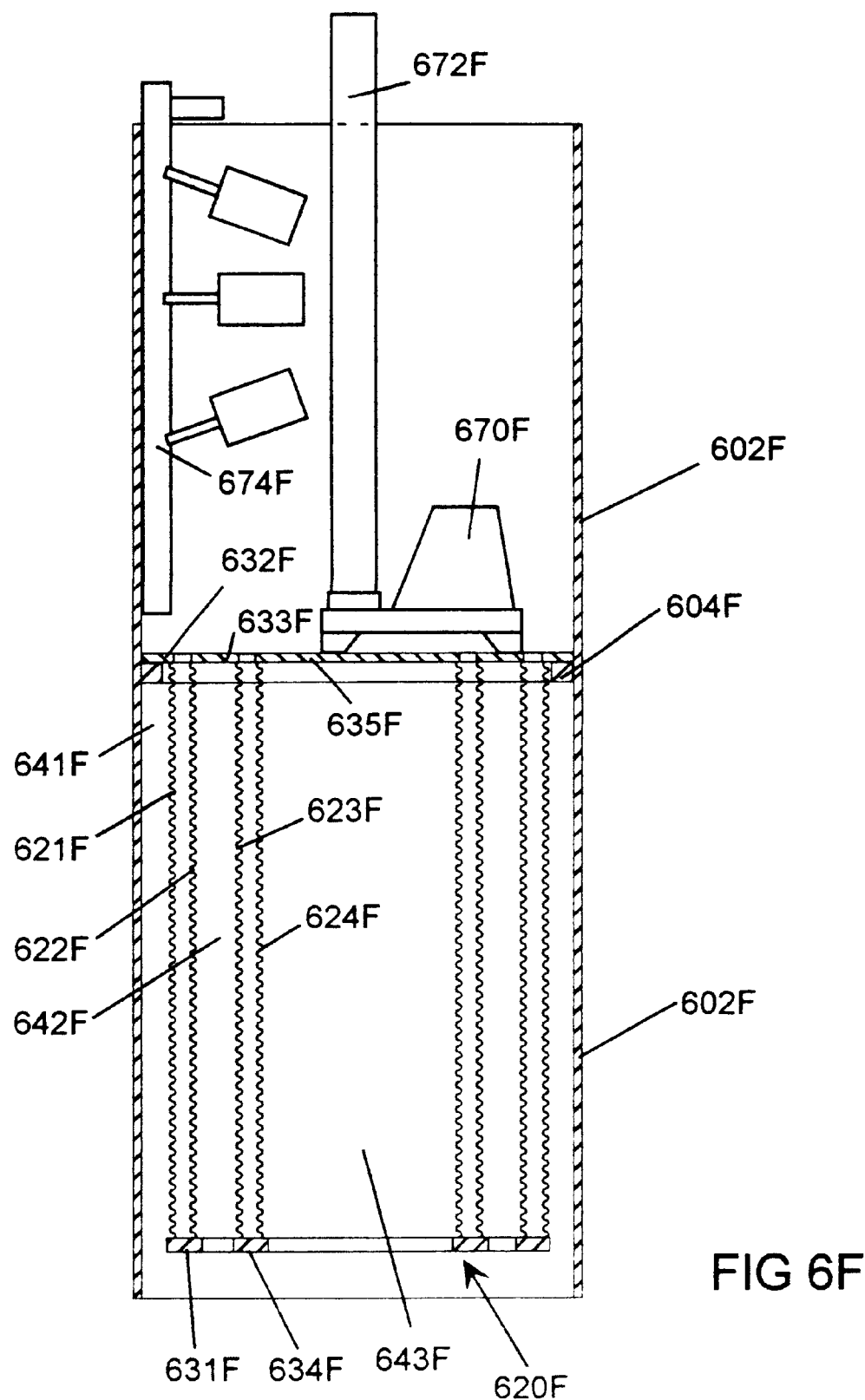
FIG. 6F is a side view showing a version of the filter element of the present invention.

FIG. 6F shows the addition of a fourth peripheral wall 624F within the third peripheral wall 623F. The bottom edges of third peripheral wall 623F and fourth peripheral wall 624F are attached by ring 634F. The top edge of peripheral wall 624F is closed to the passage of unfiltered waste water by plate 635F. This version of the filter element includes three interior locations within the shield which are open to unfiltered waste water, 641F, 642F, and 643F. Unfiltered waste water in interior location 641F may pass through the filter surfaces of the first peripheral wall 621F. Unfiltered waste water in interior location 642F may pass through the filter surfaces of peripheral walls 622F and 623F. Unfiltered waste water in interior location 643F may pass through the filter surfaces of the fourth peripheral wall 624F. A pump 670 for incremental discharge of filtered waste water is shown disposed on the plate 635F. The pump 670F includes an outlet pipe 672F and a float switching mechanism 674F.

Figure 6G:
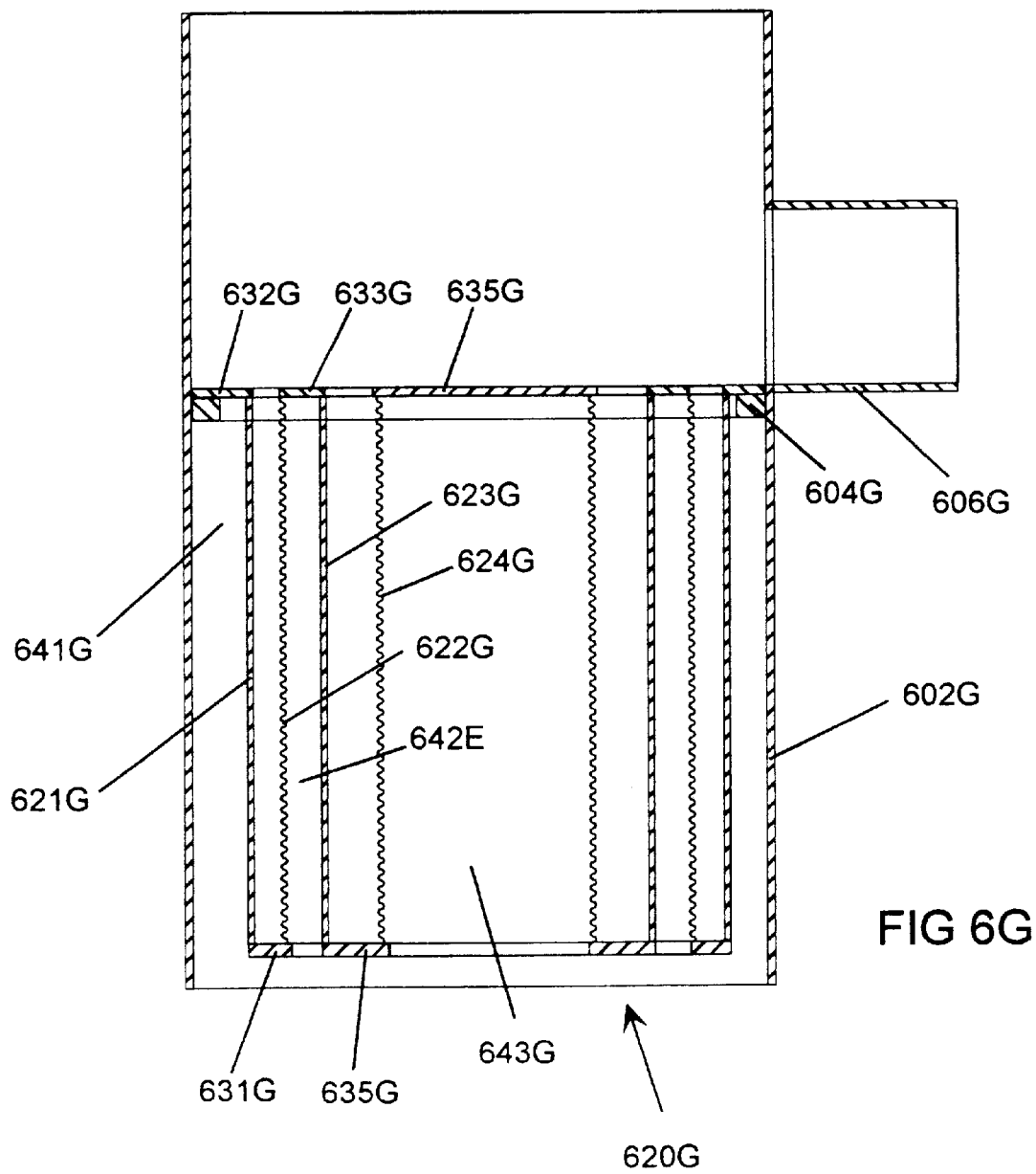
FIG. 6G is a side view showing a version of the filter element of the present invention.

FIG. 6G shows a modification of the filter element of FIG. 6F. The first peripheral wall 621G and the third peripheral wall 623G are impervious to the passage of waste water. Accordingly, unfiltered waste water having entered into the interior location 642G must pass through the filter surfaces of the second peripheral wall 622G, and unfiltered waste water having entered into the interior location 643G must pass through the filter surfaces of the fourth peripheral wall 624G. The filter element 620G of this figure, through the use of impervious peripheral walls, provides for the separation within the filter element of independent flow patterns. It is understood that the use of impervious walls within the filter element may provide benefits to waste water solids removal and could be used in any of the filter element versions of the present invention. Independent flow patterns allow easier control of flow rates through each filter surface. This allows for the equalizing of plugging rates on each filter surface.

Figure 7A:
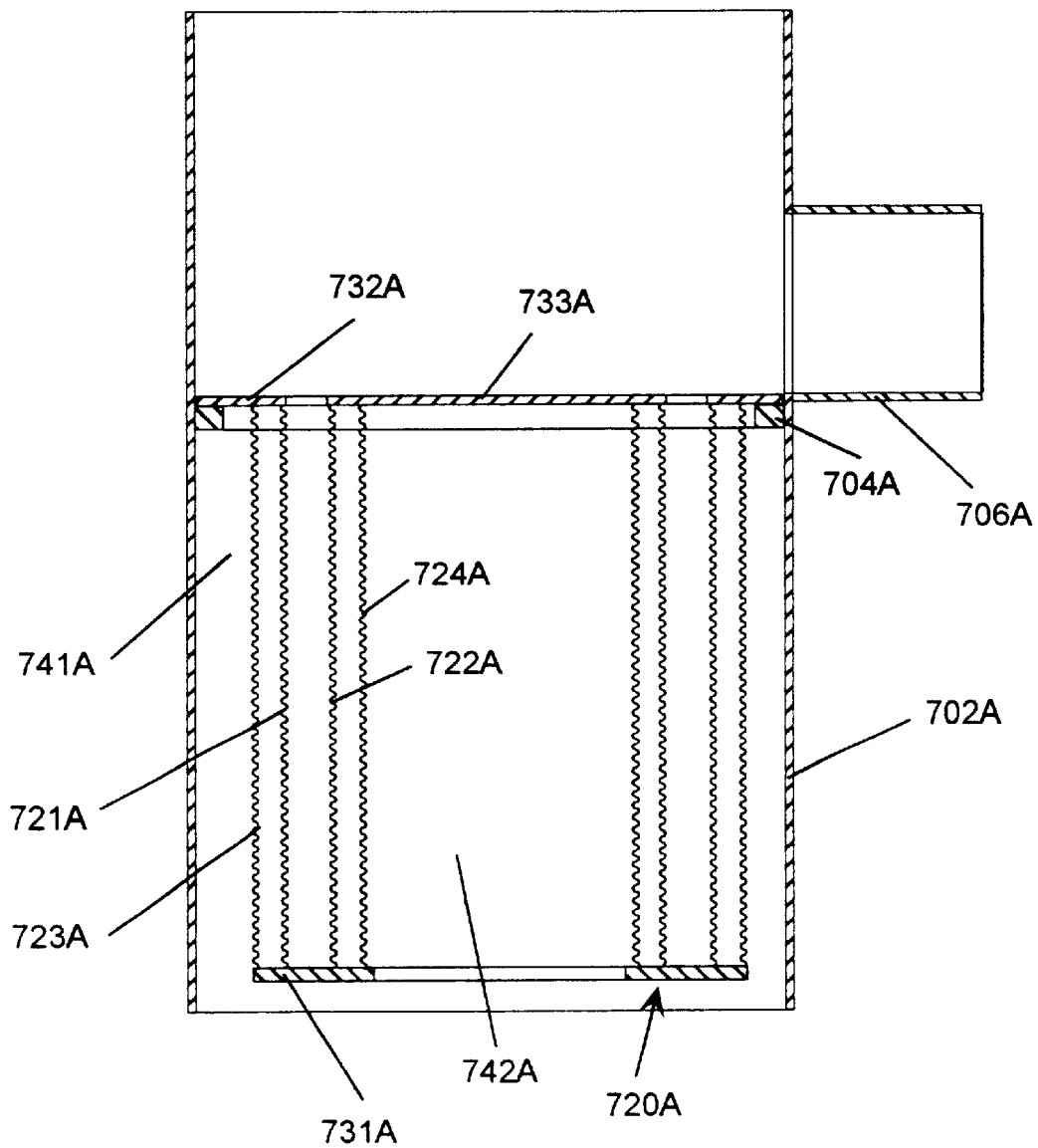
FIG. 7A is a side view showing a version of the filter element of the present invention.

FIG. 7A shows how the single peripheral walls of the element shown in FIG. 6A can be replaced with a double peripheral wall construction. Accordingly third peripheral wall 723A is disposed outside first peripheral wall 721A. And, fourth peripheral wall 724A is disposed within second peripheral wall 722A. The double peripheral wall provides sequential filtering. In particular, the filtering surface openings in third and fourth peripheral walls 723A and 724A are larger than the openings within the first and second peripheral walls 721A and 722A. Solid waste particles which are small enough to pass through the filter surface openings in the third and fourth peripheral walls will typically be unable to pass through the filter openings in the first and second peripheral walls.

It is understood that the double wall construction of FIG. 7A, which is a modification of the filter element of FIG. 6A, would be possible for any of the previous filter elements. It is also understood that a peripheral wall may be used which includes filter surfaces disposed within an otherwise impervious wall. In this example, the filter surfaces may still comprise a double wall construction which is disposed within the single peripheral wall which is otherwise impervious.

Figure 8A:
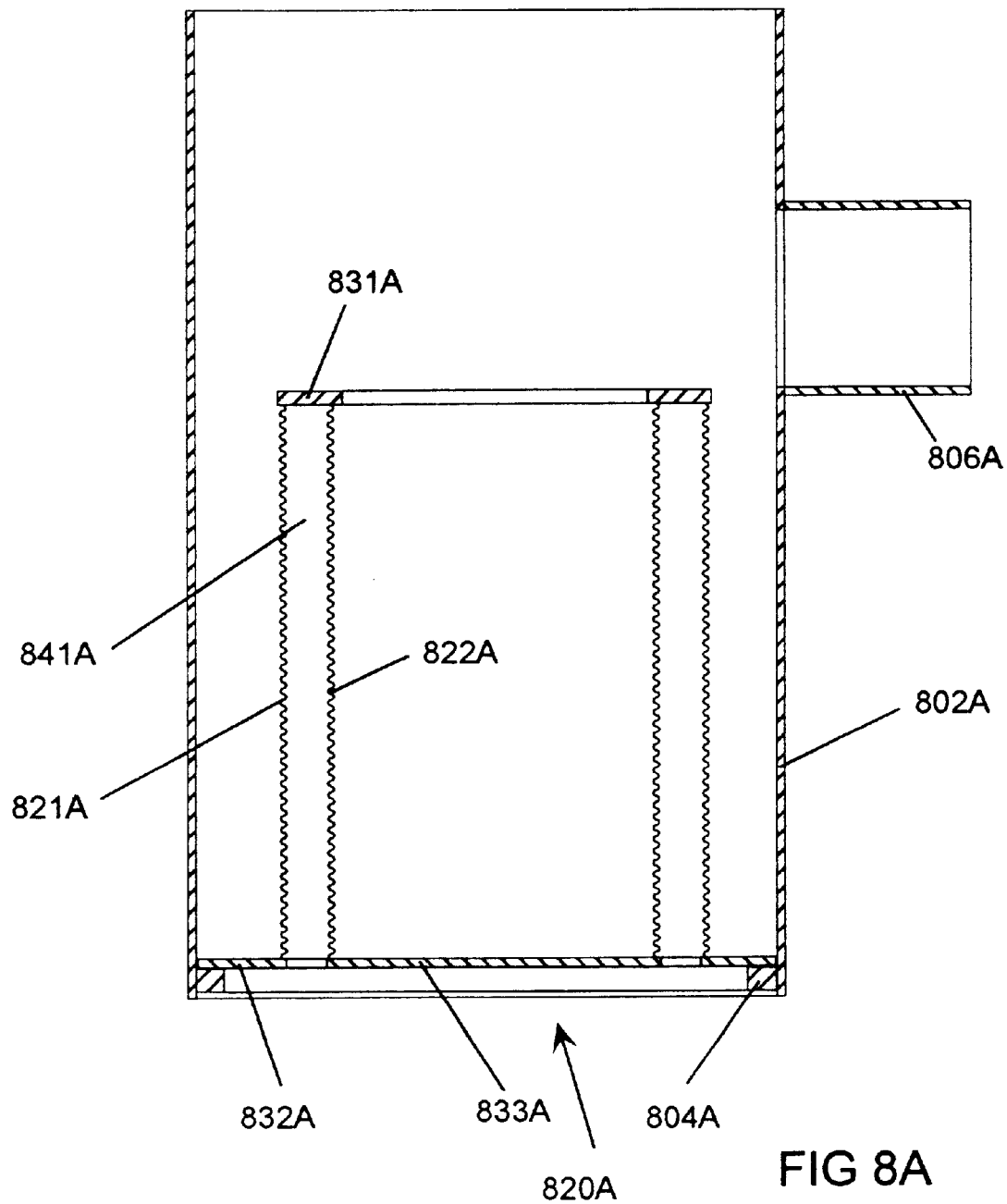
FIG. 8A is a side view showing a version of the filter element of the present invention.

FIG. 8A shows a filter element having a single inlet which is in fluid communication with a single shield interior location 841A having unfiltered waste water therein. The unfiltered waste water in the interior location 841A may pass through either of peripheral walls 821A or 822A which bound the interior location 841A. The filtered waste water having passed through either of peripheral walls 821A or 822A will then advance to an outlet. The top edges of the first and second peripheral walls 821A and 822A are attached by ring 831A. Ring 832A serves to close the region outside the first peripheral wall to unfiltered waste water by forming a seal with the interior surface of the shield. Plate 833A closes the region within the second peripheral wall 822A to the passage of unfiltered waste water.

Figure 8B:
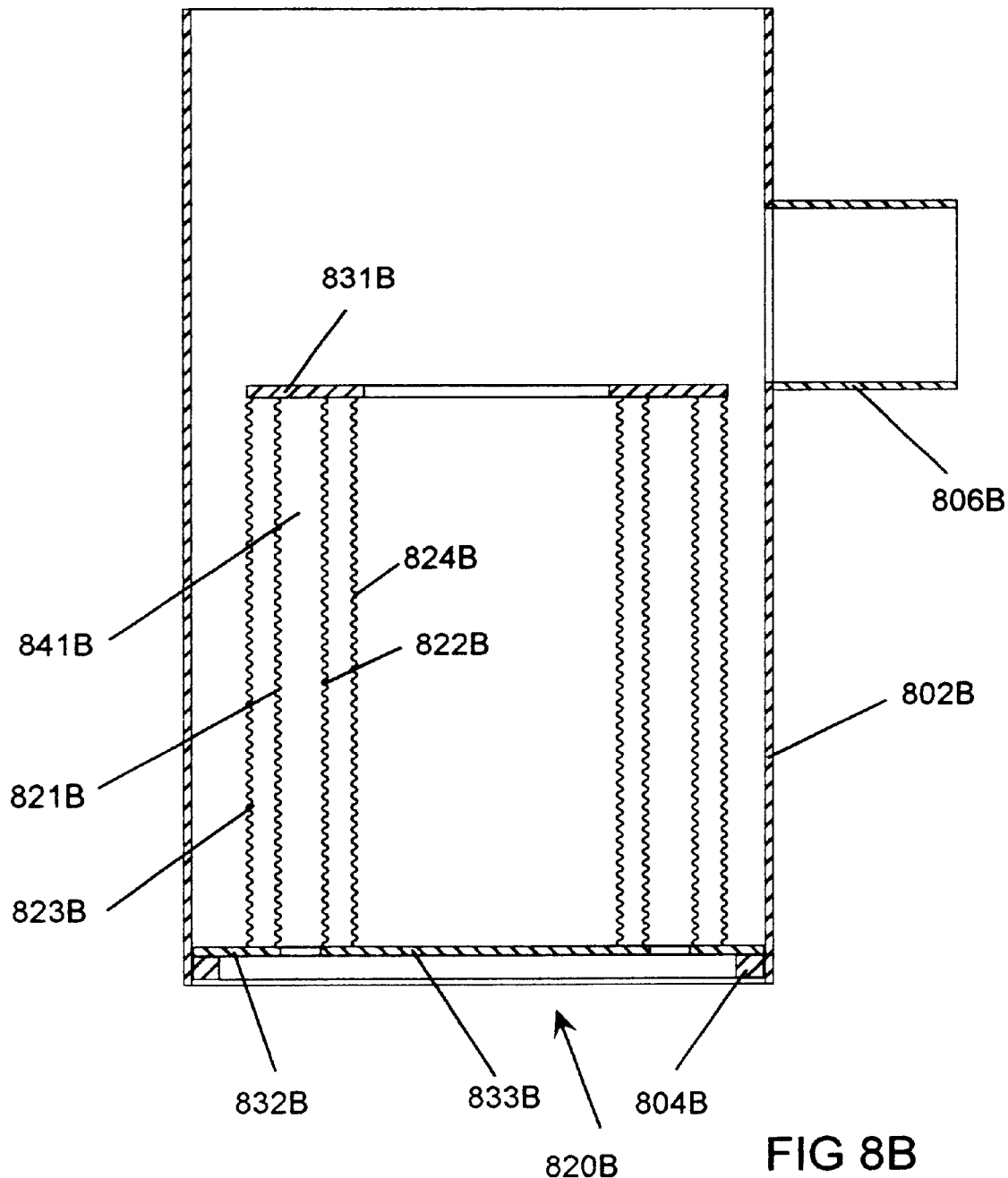
FIG. 8B is a side view showing a version of the filter element of the present invention.

FIG. 8B is a double wall version of the filter element of FIG. 8A. A third peripheral wall 823B is disposed outside of first peripheral wall 821B. A fourth peripheral wall 824B is disposed within the second peripheral wall 822B. Unfiltered waste water within the single interior location 841B within the shield must pass through two peripheral walls to advance to an outlet. As was described in FIG. 7A, the double wall allows for sequential filtering.

Figure 9A:
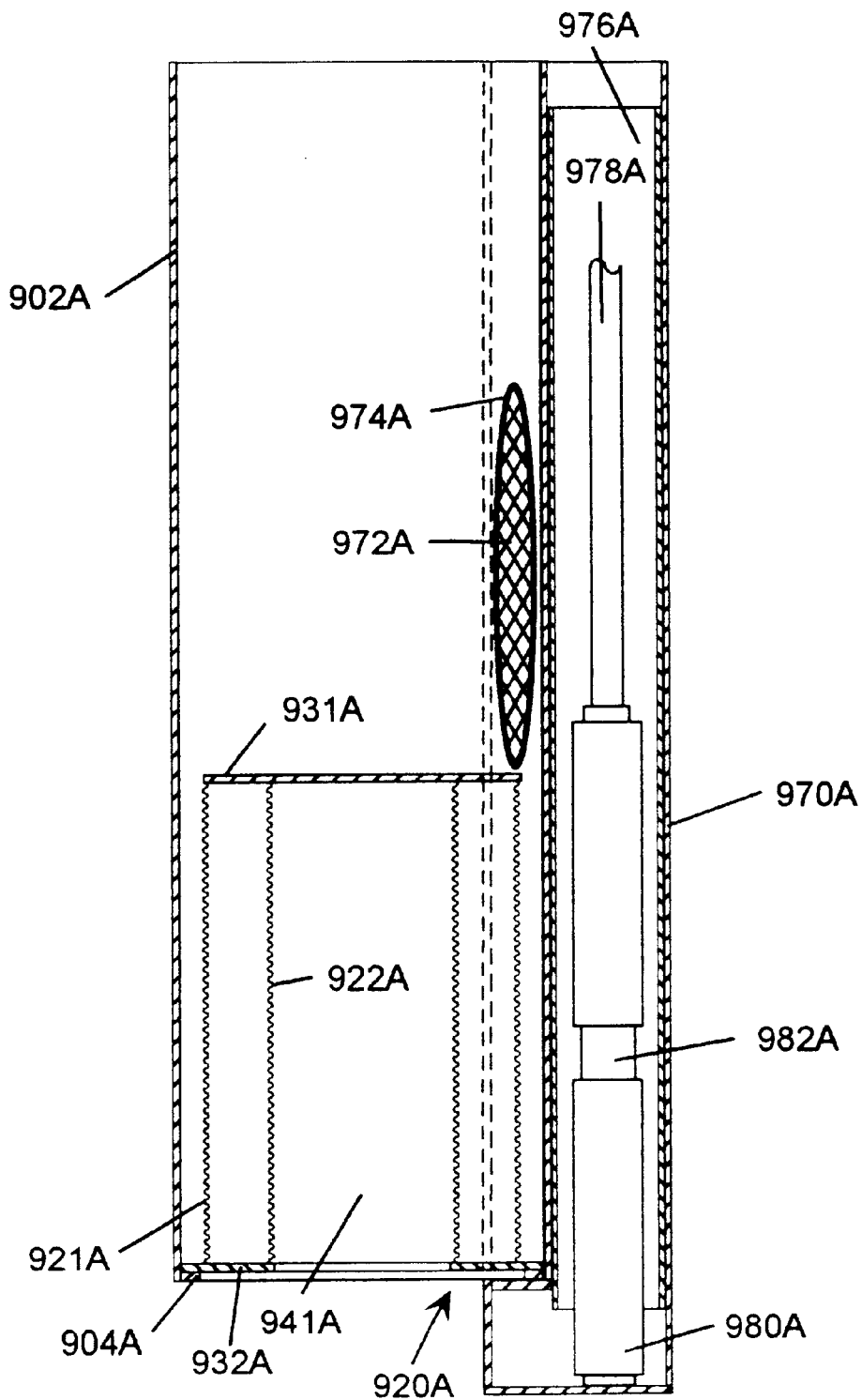
FIG. 9A is a side view showing a version of the filter element of the present invention.

FIG. 9A shows a filter element 920A including a first peripheral wall 921A including a first peripheral wall 921A and a second peripheral wall 922A disposed within the first peripheral wall 921A. The top edges of the peripheral walls are attached by plate 931A. The bottom edges of the peripheral walls are attached by ring 932A which rests on the filter element support 904A of shield 902A. Unfiltered waste water entering into the region within the second peripheral wall 941A must pass through the filtering surfaces (mesh screen or other filtering means) of the second peripheral wall 922A as well as the filtering surfaces of the first peripheral wall 921A to advance to the outlet. This waste water filter includes an outlet reservoir 970A which includes an outlet filter 972A. Filtered waste water which has passed through both peripheral walls of the filter element, must also pass through the outlet filter to be discharged from the filter by pump 980A.

FIG. 9B shows a modified version of the filter element of FIG. 9A. In this version, the first peripheral wall of the filter element 921B surrounds a series of second peripheral walls each of which comprise a mesh screen tube 922B. The mesh screen tubes are open at their bottom edges to allow unfiltered waste water to enter into the interior of the tubes. The waste water passing through the peripheral walls of the tubes will proceed to an enclosed region surrounding the second peripheral walls 922B and then pass through the first peripheral wall 921B. Waste water having passed through the first peripheral wall is discharged through a suitable outlet. The tubes 922B each include a plate 932B to close the top of the tubes to the passage of unfiltered waste water. A plate 931B seals the top of the first peripheral wall from the passage of unfiltered waste water. A perforated plate 933B seals the filter element within a shield and includes perforated openings 934B for the passage of unfiltered waste water into the tubes 922B.

Figure 9C:
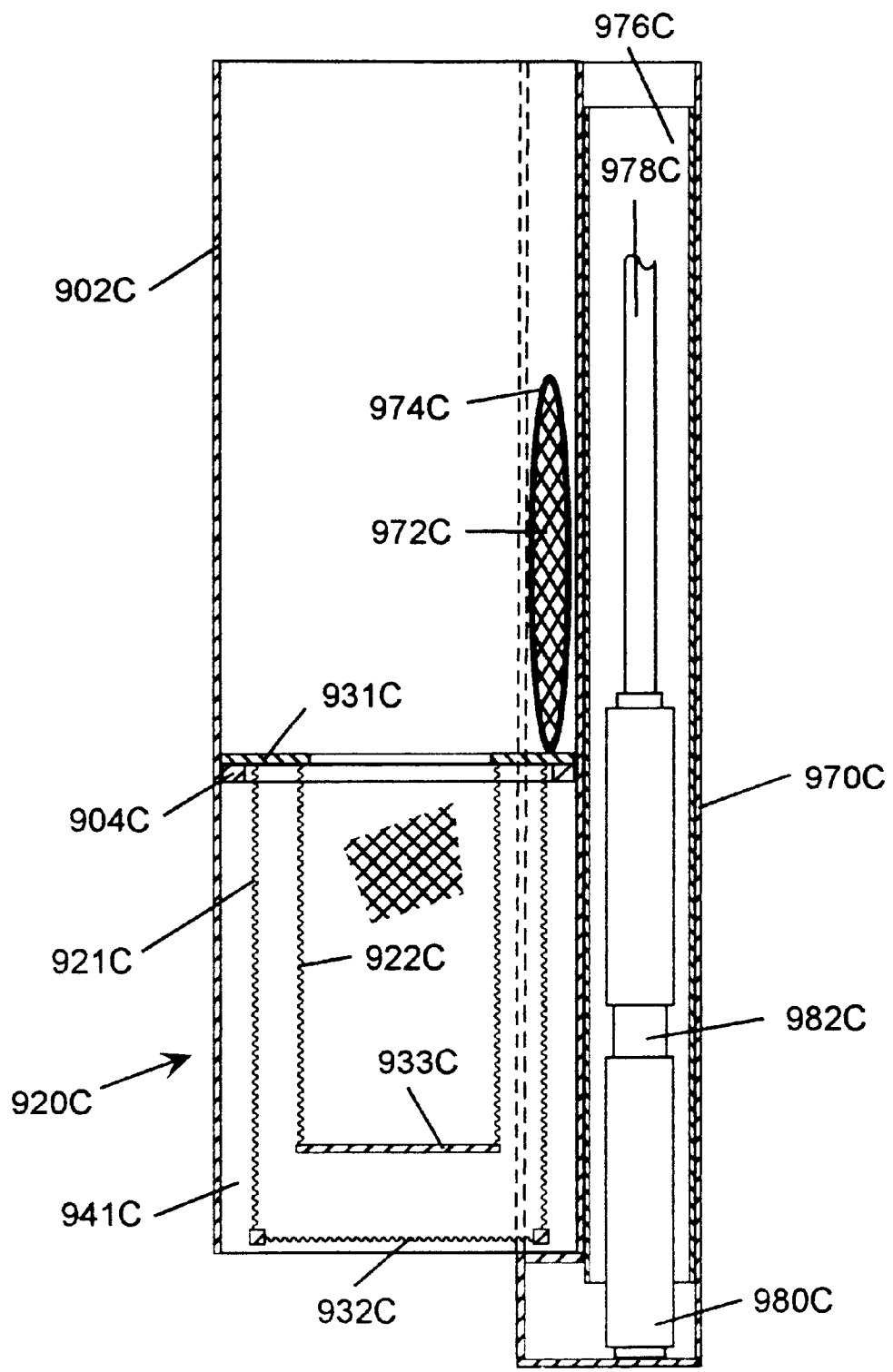
FIG. 9C is a side view showing a version of the filter element of the present invention.

FIG. 9C shows a filter element 920C which includes a first peripheral wall 921C and a second peripheral wall 922C disposed within the first peripheral wall 921C. The top edges of the first and second peripheral walls are attached by ring 931C. Ring 931C is supported by the filter support 904C of shield 902C. Ring 931C further serves to close the interior of the shield from unfiltered waste water which has entered into the shield interior location 941C. The bottoms of both peripheral walls are also closed to the passage of unfiltered waste water. First peripheral wall 921C includes a bottom filter panel 932C. Second peripheral wall 922C includes an impervious plate 933C. Unfiltered waste water in the interior location 941C must first pass through the filtering means of the first and second peripheral walls to be discharged from an outlet. It is understood that a filter panel such as 932C could have been used in place of impervious plate 933C. Such a modification could have been made in any of the previously disclosed filter elements, as well. It is also understood that impervious rings which have been used to attach adjacent peripheral walls of the filter element could have also comprised a filtering mesh screen or other filtering means.

Figure 9D:
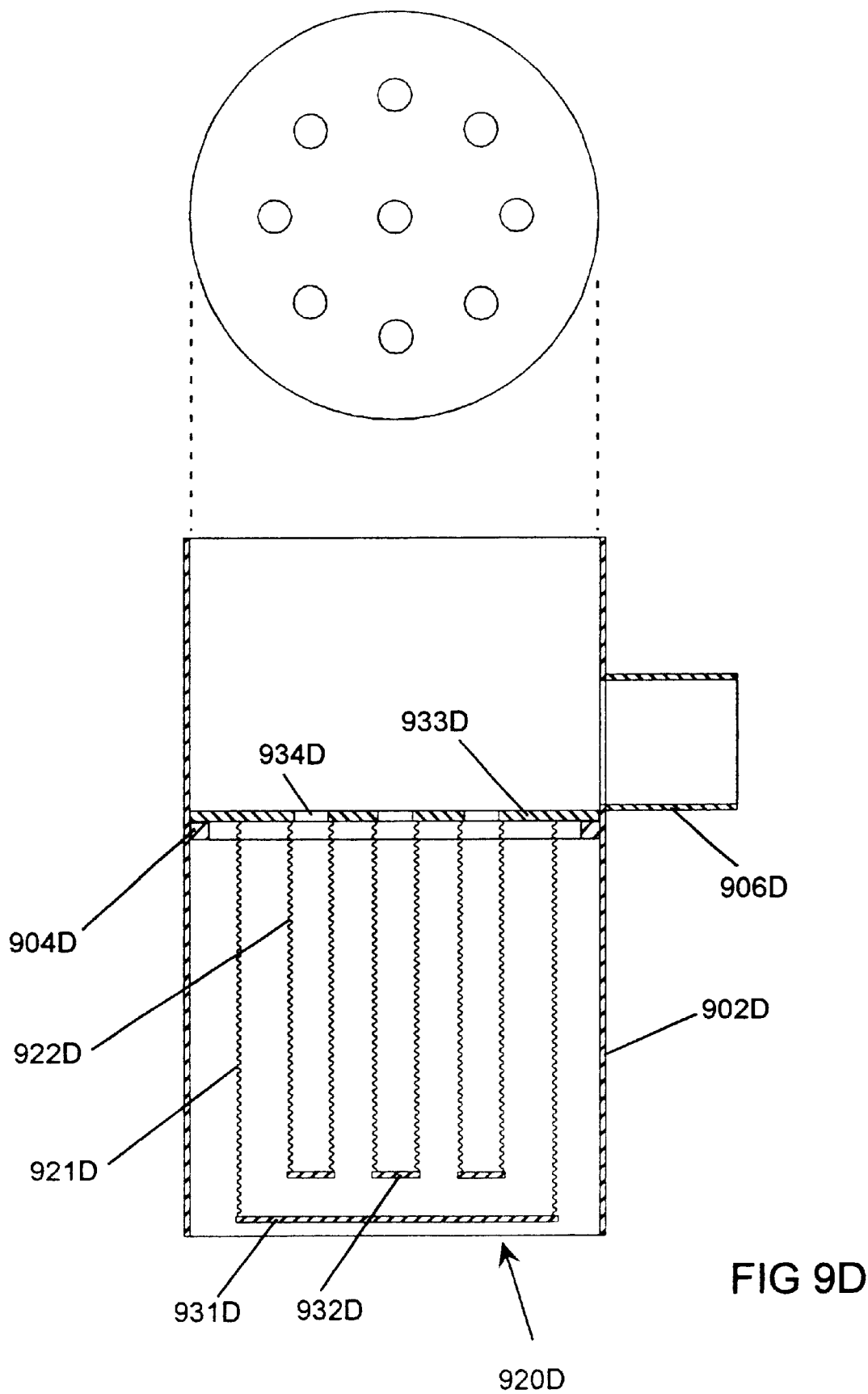
FIG. 9D is a side view showing a version of the filter element of the present invention.

FIG. 9D shows a modified version of the filter element of FIG. 9C. In this version, the first peripheral wall of the filter element 921D surrounds a series of second peripheral walls each of which comprise a mesh screen tube 922D. Waste water passing through the first peripheral wall 921D will proceed to an enclosed region surrounding the peripheral walls of tubes 922D and then pass through the peripheral wall of the tubes 922D. The mesh screen tubes are closed at their bottom edges by plates 932D to prevent waste water from entering into the interior of the tubes without passing through the peripheral wall of the tubes. Waste water having passed through the peripheral walls of the tubes 922D is discharged through a suitable outlet. A plate 931D seals the bottom of the first peripheral wall from the passage of unfiltered waste water. A perforated plate 933D seals the filter element within a shield and includes perforated openings 934D for the passage of filtered waste water from the interior of the tubes 922D.

Figure 10A:
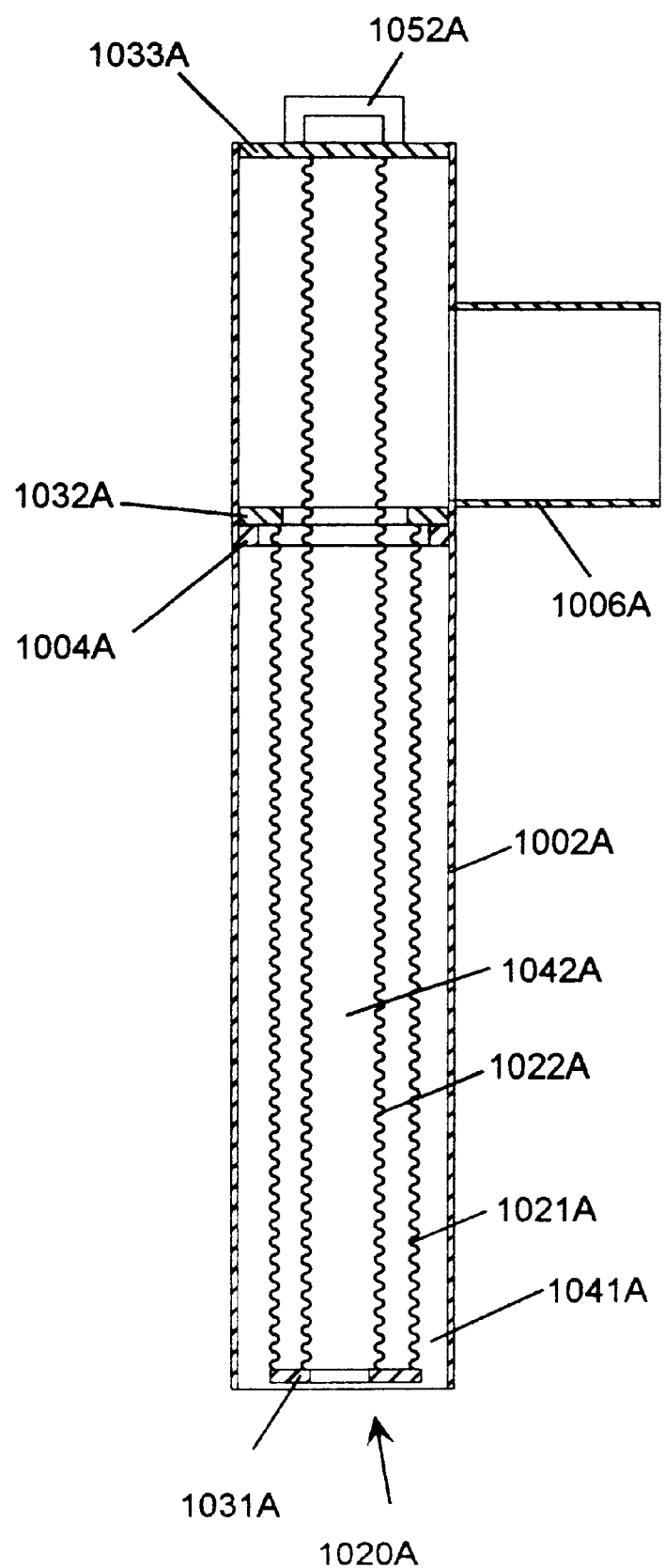
FIG. 10A is a side view showing a version of the filter element of the present invention.

FIG. 10A shows a side view of another version of the waste water filter of the present invention. The waste water filter is a modification of the filter of FIG. 6A. The waste water filter includes an open bottomed shield 1002A comprising a vertically disposed peripheral wall substantially in the shape of a cylinder. An outlet fitting 1006A is attached to the shield which allows filtered waste water to exit the filter. Disposed below the outlet fitting 1006A is a filter element support ring 1004A. Supported by the filter support ring within the shield is a filter element 1020A which includes a first peripheral wall 1021A and a second peripheral wall 1022A disposed within the first peripheral wall at a predetermined spaced apart distance therefrom. The first peripheral wall is also disposed at a spaced apart distance from the interior surface of the shield. The first and second peripheral walls of the filter element include filtering surfaces which may comprise a mesh screen or other suitable filtering material.

A shield interior location 1041A separates the first peripheral wall 1021A from the interior surface of the shield 1002A. A second shield interior location 1042A is disposed in the region bounded by the second peripheral wall 1022A. Waste water which has entered into the shield interior is maintained within the first and second shield interior locations 1041A and 1042A. This waste water is unfiltered if the shield inlet comprises an open bottom as is shown in this figure. If the shield inlet comprises filtering orifices within the peripheral wall of the shield, waste water partially filtered by the orifices, but unfiltered by the filter element, is maintained within the first and second shield interior locations 1041A and 1042A The first peripheral wall 1021A and second peripheral wall 1022A are attached together at their bottom edges by a ring 1031A which prevents unfiltered waste water from entering into the intervening area between the first and second peripheral walls. The filter element further includes a ring 1032A attached to the first peripheral wall and a plate 1033A attached to the second peripheral wall 1022A. The ring 1032A forms a seal with the interior surface of the shield, the plate 1033A seals the top edge of the second peripheral wall and comprises a cap for the filter. Accordingly, the rings prevent unfiltered waste water to penetrate further into the waste water filter without passing through the filter surfaces of the first and second peripheral walls. The top of the filter element includes a portion of the second peripheral wall which extends vertically above the first peripheral wall. The uppermost section of this portion would be unused in normal operation. A handle 1052A is fixed on the cap 1033A. Unfiltered waste water in interior location 1041A may pass through the filter surfaces of the first peripheral wall 1021A. Unfiltered waste water in interior location 1042A may pass through the filter surfaces of the second peripheral wall 1022A. The filtered waste water which has passed through any of the filtering surfaces of the two peripheral walls will advance through the shield interior and exit the filter through the outlet fitting 1006A.

Figure 10B:
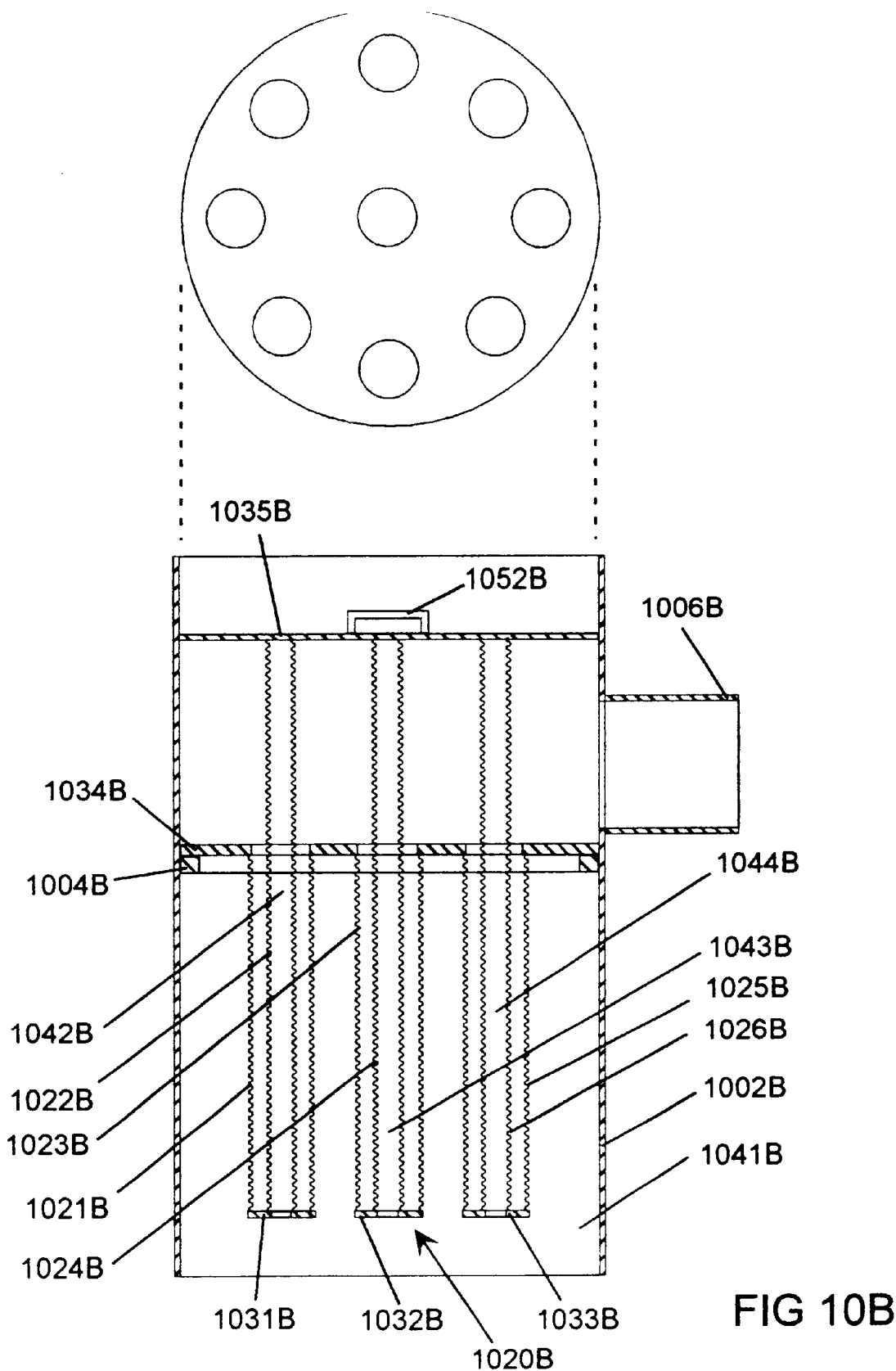
FIG. 10B is a side view showing a version of the filter element of the present invention.

FIG. 10B shows a waste water filter including a filter element 1020B which is an expanded version of the waste water filter element of FIG. 10A. In this version the waste water filter includes a large diameter shield 1002B in which a filter element 1020B is disposed which filters unfiltered waste water which enters the open bottom of the shield 1002B before it exits the filter at the outlet 1006B. The filter element is supported by ring support 1004B which is disposed beneath the filter outlet fitting 1006B.

The filter element includes a series of three filter enclosures such as were disclosed on FIG. 10A. The three filter enclosures include first peripheral filtering walls 1021B, 1023B and 1025B, as well as second peripheral filtering walls 1022B, 1024B and 1026B, respectively. The first and second peripheral wall of each enclosure are attached together at their bottom edges by rings 1031B, 1032B and 1033B which prevent unfiltered waste water from entering into the intervening region between the first and second peripheral walls of each enclosure. The filter element further includes a perforated plate 1034B attached to the first peripheral walls and a plate 1035B attached to the second peripheral walls. The plate 1034B forms a seal with the interior surface of the shield. Plate 1035B seals the top edge of the second peripheral walls and forms a cap for the filter.

Accordingly, the rings prevent unfiltered waste water to penetrate further into the waste water filter without passing through the filter surfaces of the first and second peripheral walls. Disposed on the cap plate 1035B is a handle 1052B.

The top of the filter element includes a portion of the second peripheral walls of each filter enclosure which extend vertically above the first peripheral walls. Unfiltered waste water in interior location 1041B separates the first peripheral walls 1021B, 1023B, and 1025B from the interior surface of the shield 1002B. Second shield interior locations 1042B, 1043B, and 1044B are disposed in the regions bounded by the second peripheral walls 1022B, 1024B, and 1026B. Waste water which has entered into the shield interior is maintained within the first and second shield interior locations 1041B as well as 1042B, 1043B, and 1044B. This waste water is unfiltered if the shield inlet comprises an open bottom as is shown in this figure. If the shield inlet comprises filtering orifices within the peripheral wall of the shield, waste water partially filtered by the orifices, but unfiltered by the filter element, is maintained within the first and second shield interior locations. Unfiltered waste water in interior location 1041B may pass through the filter surfaces of the first peripheral wall 1021B, 1023B and 1025B. Unfiltered waste water in interior locations 1042B, 1043B and 1044B may pass through the filter surfaces of the second peripheral walls 1022B, 1024B, and 1026B. The filtered waste water which has passed through any of the filtering surfaces of the two peripheral walls will advance through the shield interior and exit the filter through the outlet fitting 1006B. The first and second peripheral walls of the filter element include filtering surfaces which may comprise a mesh screen or other suitable filtering material.

Figure 10C:
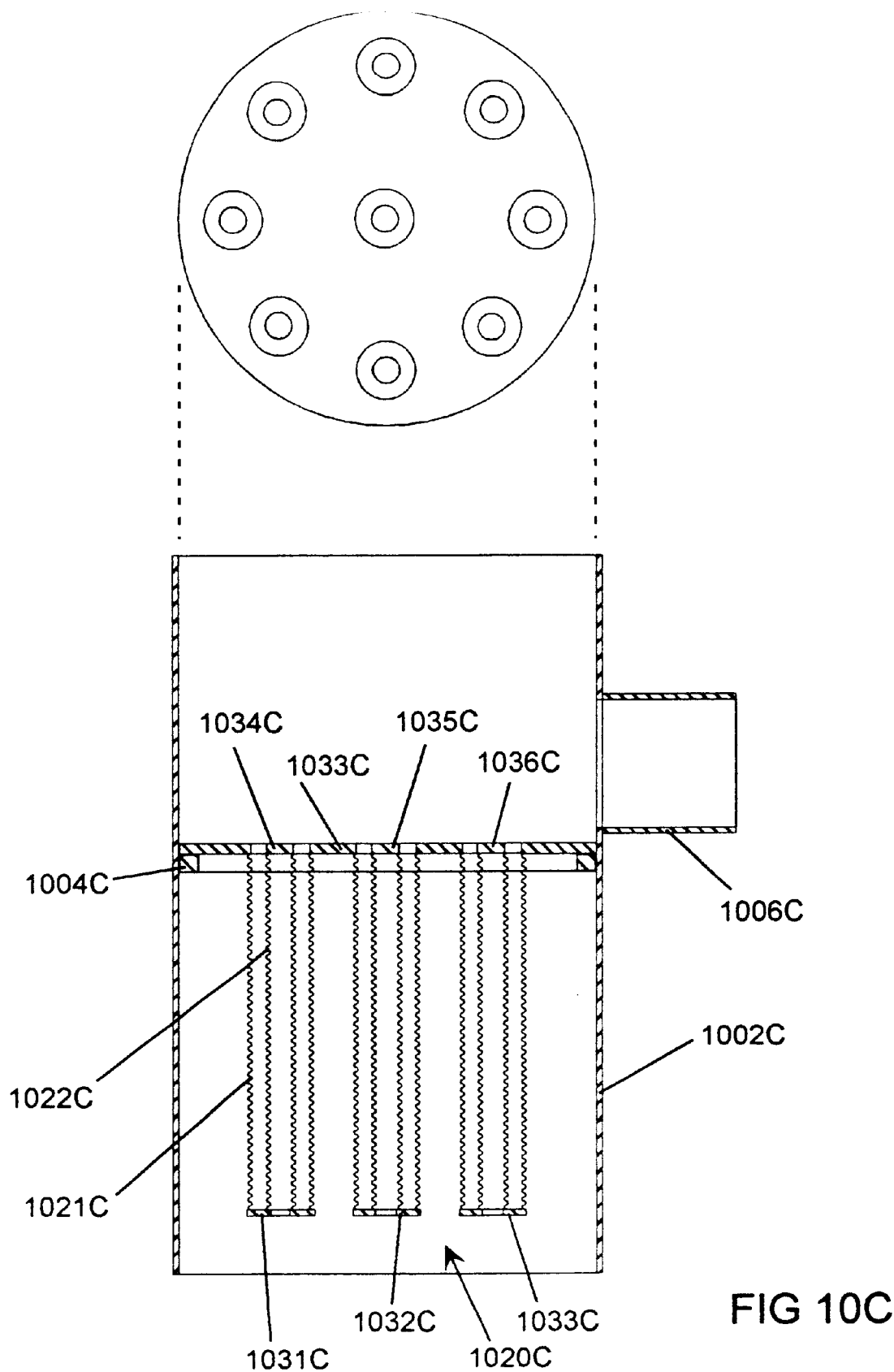
FIG. 10C is a side view showing a version of the filter element of the present invention.

FIG. 10C shows a waste water filter which includes a filter element which is a modified version of the filter element of FIG. 10B In this version, the portions of the second peripheral walls 1022B, 1024B, and 1026B which extended above the plate 1034B in the filter element of FIG. 10B have been removed. Accordingly, this figure shows the first and second peripheral walls of each of the filter enclosures having upper ends which are at the same elevation as the plate 1033C. The second peripheral walls 1022C, 1024C, and 1026C include a plug 1034C, 1035C, and 1036C, respectively, to prevent the passage of unfiltered waste water. The filtering of waste water is otherwise identical to that described for FIG. 10B.

Figure 10D:
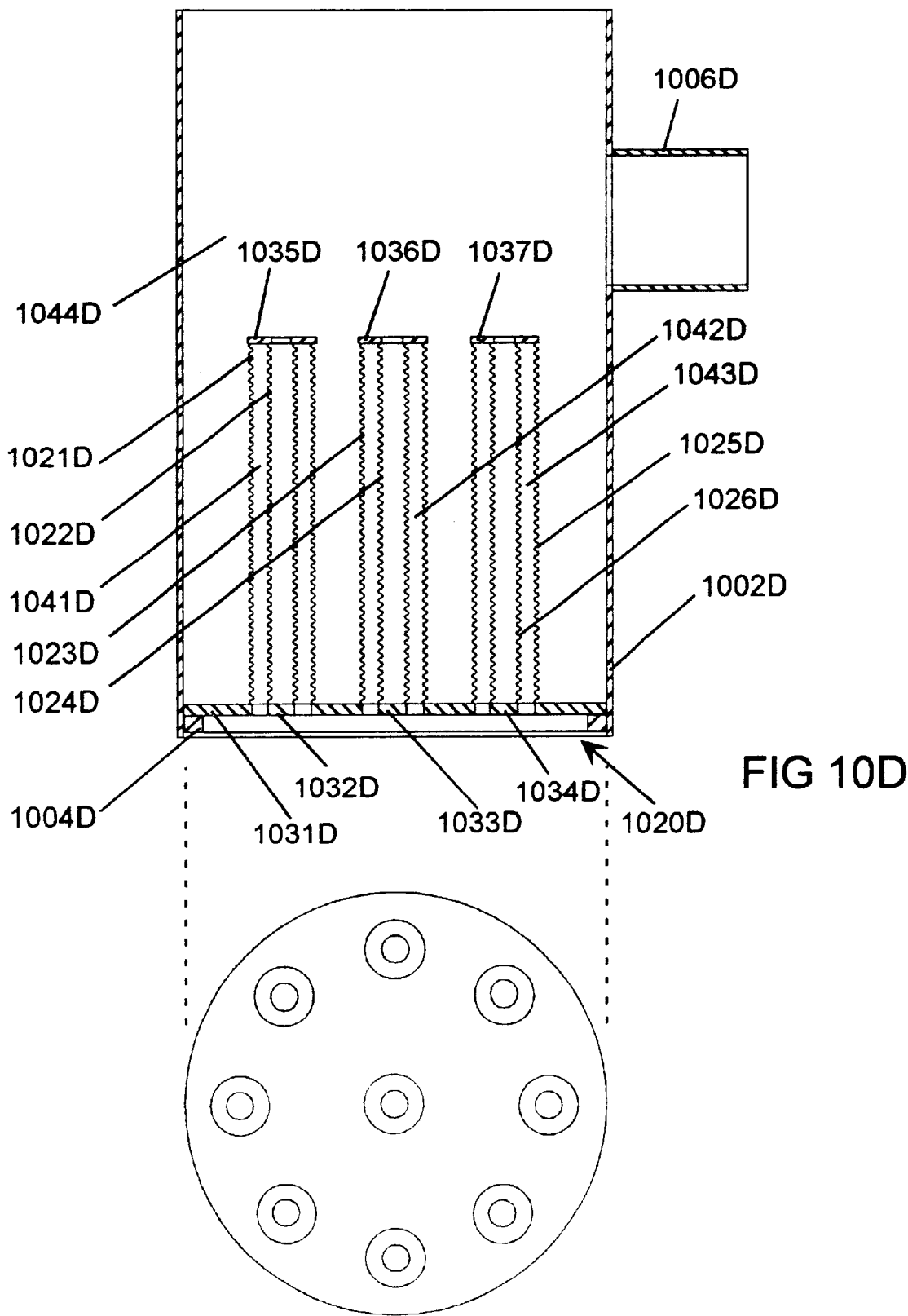
FIG. 10D is a side view showing a version of the filter element of the present invention.

FIG. 10D shows a waste water filter having a filter element which is a modified version of the element previously shown in FIG. 8A. The filter element includes three filter enclosures each comprising first and second peripheral filtering walls. First peripheral walls 1021D, 1023D, and 1025D have a lower end which is secured to plate 10311D. Second peripheral walls 1022D, 1024D, and 1026D include plugs 1032D, 1033D, and 1034D, respectively, which prevent unfiltered waste water from entering into the region bounded by the second peripheral walls. Rings 1035D, 1036D, and 1037D attach the top edges of the first and second peripheral walls of each respective filter enclosure. The rings 1035D, 1036D, and 1037D prevent unfiltered waste water which has entered into the regions 1041D, 1042D, and 1043D from passing into the filter interior 1044D without passing through the filtering surfaces of the first or second peripheral walls. Filtered waste water in the region 1044D is discharged out the outlet fitting 1006D. It is understood that more than three filter enclosures could have been used in the filter elements of FIGS. 10B, 10C, and 10D.

The peripheral walls of all of the previously described filter elements are typically cylindrical in shape with a circular cross section. The walls are also typically disposed to maintain concentricity about a central axis. It is understood that other cross sectional shapes other than circular may be used. It is understood that various modifications and changes in form and detail could readily be made without departing from the spirit of the invention. It is therefore intended that the invention be not limited to the exact form and detail herein shown and described, nor to anything less than the whole of the invention herein disclosed and as hereinafter claimed.

I claim:

1. A septic tank waste water filter for use in a septic tank comprising:

a shield comprising a vertical peripheral wall defining a shield interior;

the shield further comprising an inlet for the entry of wastewater into the shield interior;

a shield filter element disposed within the shield interior; the shield filter element including at least one filter surface; wherein the filter surface includes filter surface openings for the passage of relatively clear water while restricting the passage of solids larger than the openings;

wherein the shield filter element, when disposed within the shield, separates the shield interior into at least first and second interior locations; wherein waste water unfiltered by the filter element, in the first interior location is separated from filtered waste water in the second interior location by the shield filter element;

a seal disposed on the filter element, wherein the seal prevents waste water in the first interior location from passing into the second interior location without passing through the filter element;

wherein the shield filter element is removable from the shield; and wherein unfiltered waste water entering the shield interior after shield filter element removal will enter the first and second interior locations; and an outlet reservoir including at least a vertical peripheral wall, the outlet reservoir further including an inlet opening in fluid communication with the second interior location for allowing the entry of filtered waste water from the second interior location of the shield into the outlet reservoir, and an outlet for discharging filtered waste water; the outlet reservoir defining a chanter substantially closed to the entry of waste water other than through the inlet;

an increment discharge apparatus disposed in the outlet reservoir in fluid communication with the outlet;

wherein the outlet reservoir includes a top opening; and, wherein the outlet reservoir is disposed relative to the filter element such that the removal of the filter element from the shield does not require the removal of the incremental discharge apparatus; and, wherein the incremental discharge apparatus is removable from the outlet reservoir through the top opening without requiring the removal of the filter element from the shield; and, wherein the inlet opening into the outlet reservoir is disposed at a vertical position above the seal disposed on the filter element, and wherein the inlet opening is disposed such that at least a portion of the vertical peripheral wall of the outlet reservoir is disposed at a vertical position above the inlet opening into the reservoir.

2. The septic tank waste water filter of claim 1 wherein the shield inlet is disposed below the seal.

3. A septic tank waste water filter for use in a septic tank comprising:
   a shield comprising a vertical peripheral wall defining a shield interior;
   the shield further comprising an inlet for the entry of wastewater into the shield interior;
   a shield filter element disposed within the shield interior; the shield filter element including at least one filter surface; wherein the filter surface includes filter surface openings for the passage of relatively clear water while restricting the passage of solids larger than the openings;
   wherein the shield filter element, when disposed within the shield, separates the shield interior into at least first and second interior locations; wherein waste water unfiltered by the filter element in the first interior location is separated from filtered waste water in the second location by the shield filter element;
   a first top seal and second bottom seal disposed on the filter element, wherein the seals prevent waste water in the first interior location from passing into the second interior location without passing through the filter element;
   wherein the shield filter element is removable from the shield; and wherein unfiltered waste water entering the shield interior after shield filter element removal will enter the first and second interior locations; and
   an outlet reservoir including at least a vertical peripheral wall, the outlet reservoir further including an inlet opening in fluid communication with the second interior location for allowing the entry of filtered waste water from the second interior location of the shield into the outlet reservoir, and an outlet for discharging filtered waste water; the outlet reservoir defining a chamber substantially closed to the entry of waste water other than through the inlet;
   an incremental discharge apparatus disposed in the outlet reservoir in fluid communication with the outlet;
   wherein the outlet reservoir includes a top opening; and, wherein the outlet reservoir is disposed relative to the filter element such that the removal of the filter element from the shield does not require the removal of the incremental discharge apparatus; and, wherein the incremental discharge apparatus is removable from the outlet reservoir through the top opening without requiring the removal of the filter element from the shield; and,
   wherein the inlet opening into the outlet reservoir is disposed at a vertical position between the first and second seals disposed on the filter element.

4. The septic tank waste water filter of claim 3, wherein the shield inlet is disposed below the second seal.

5. A septic tank waste water filter comprising:
   a shield comprising a vertical peripheral wall defining a shield interior;
   the shield further comprising an inlet for the entry of wastewater into the shield interior;
   a shield filter element disposed within the shield interior; the shield filter element including at least one filter surface; wherein the filter surface includes filter surface openings for the passage of relatively clear water while restricting the passage of solids larger than the openings;
   wherein the shield filter element, when disposed within the shield, separates the shield interior into at least first and second interior locations; wherein waste water unfiltered by the filter element in the first interior location is separated from filtered waste water in the second location by the shield filter element;
   a first top seal and a second bottom seal disposed on the filter element, wherein the seals prevent waste water in the first interior location from passing into the second interior location without passing through the filter element;
   wherein the shield filter element is removable from the shield; and wherein unfiltered waste water entering the shield interior after shield filter element removal will enter the first and second interior locations; and
   an outlet reservoir including at least a vertical peripheral wall, the outlet reservoir further including an inlet opening in fluid communication with the second interior location for allowing the entry of filtered waste water from the second interior location of the shield into the outlet reservoir, and an outlet for discharging filtered waste water; the outlet reservoir defining a chamber substantially closed to the entry of waste water other than through the inlet;
   an incremental discharge apparatus disposed in the outlet reservoir in fluid communication with the outlet;
   wherein the outlet reservoir includes a top opening; and, wherein the outlet reservoir is disposed relative to the filter element such that the removal of the filter element from the shield does not require the removal of the incremental discharge apparatus; and, wherein the incremental discharge apparatus is removable from the outlet reservoir through the top opening without requiring the removal of the filter element from the shield; and,
   wherein the inlet opening into the outlet reservoir is disposed at a vertical position above the first and second seals disposed on the filter element.

6. The septic tank waste water filter of claim 5, wherein the shield inlet is disposed between the first and second seals.

7. A septic tank waste water filter comprising:
   a shield comprising a vertical peripheral wall defining a shield interior;
   the shield further comprising an inlet for the entry of wastewater into the shield interior;
   a shield filter element disposed within the shield interior; the shield filter element including at least one filter surface; wherein the filter surface includes filter surface openings for the passage of relatively clear water while restricting the passage of solids larger than the openings;
   wherein the shield filter element, when disposed within the shield, separates the shield interior into at least first and second interior locations; wherein waste water unfiltered by the filter element, in the first interior location is separated from filtered waste water in the second interior location by the shield filter element;
   a first top seal and second bottom seal disposed on the filter element, wherein the seal prevents waste water in the first interior location from passing into the second interior location without passing through the filter element;
   wherein the shield filter element is removable from the shield, and wherein unfiltered waste water entering the shield interior after shield filter element removal wilt enter the first and second interior locations; and an outlet reservoir including at least a vertical peripheral wall, the outlet reservoir further including an inlet opening in fluid communication with the second interior location for allowing the entry of filtered waste water from the second interior location of the shield into the outlet reservoir, and an outlet for discharging filtered waste water; the outlet reservoir defining a chamber substantially closed to the entry of waste water other than through the inlet;

an increment discharge apparatus disposed in the outlet reservoir in fluid communication with the outlet;

wherein the outlet reservoir includes a top opening; and, wherein the outlet reservoir is disposed relative to the filter element such that the removal of the filter element from the shield does not require the removal of the incremental discharge apparatus; and, wherein the incremental discharge apparatus is removable from the outlet reservoir through the top opening without requiring the removal of the filter element from the shield; and, wherein the inlet opening into the outlet reservoir is disposed at a vertical position below the first top seal disposed on the filter element and above the second bottom seal.

8. The septic tank waste water filter of claim 7, wherein the shield inlet is disposed above the first top seal.

\* \* \* \* \*